United States Patent
Crudden et al.

(10) Patent No.: US 12,241,144 B2
(45) Date of Patent: Mar. 4, 2025

(54) NICKEL-BASED ALLOY

(71) Applicant: ALLOYED LIMITED, Yarnton Kidlington (GB)

(72) Inventors: David Crudden, Yarnton (GB); John William Gordon Clark, Yarnton (GB); Andre Nemeth, Yarnton (GB)

(73) Assignee: ALLOYED LIMITED, Kidlington (GB)

( * ) Notice: Subject to any disclaimer, the term of this patent is extended or adjusted under 35 U.S.C. 154(b) by 136 days.

(21) Appl. No.: 17/616,782

(22) PCT Filed: Jun. 3, 2020

(86) PCT No.: PCT/GB2020/051330
§ 371 (c)(1),
(2) Date: Dec. 6, 2021

(87) PCT Pub. No.: WO2020/245575
PCT Pub. Date: Dec. 10, 2020

(65) Prior Publication Data
US 2022/0316031 A1    Oct. 6, 2022

(30) Foreign Application Priority Data
Jun. 7, 2019  (GB) .................... 1908148

(51) Int. Cl.
*C22C 19/00* (2006.01)

(52) U.S. Cl.
CPC .................... *C22C 19/00* (2013.01)

(58) Field of Classification Search
CPC ....... C22C 19/00; C22C 19/05; C22C 19/057; C22C 19/056; B23K 35/3033; B23K 35/304; B33Y 70/00
See application file for complete search history.

(56) References Cited

U.S. PATENT DOCUMENTS

| 3,941,590 A | 3/1976 | Watanabe |
| 5,130,089 A | 7/1992 | Henry |

(Continued)

FOREIGN PATENT DOCUMENTS

| DE | 102015016729 | 6/2017 |
| EP | 0403682 | 12/1990 |

(Continued)

OTHER PUBLICATIONS

Cruchley et al., "Chomia layer growth on a Ni-based superalloy: Sub-parabolic kinetics and the role of titanium", *Corrosion Science*, 2013.

(Continued)

*Primary Examiner* — Anthony M Liang
*Assistant Examiner* — Danny N Kang
(74) *Attorney, Agent, or Firm* — NORTON ROSE FULBRIGHT US LLP

(57) ABSTRACT

A nickel-based alloy composition consisting, in weight percent, of: 4.0 to 5.6% aluminium, 0.0 to 1.0% titanium, 0.0 to 4.0% niobium, 0.0 to 11.9% tantalum, 2.0 to 12.7% tungsten, 0.0 to 3.0% molybdenum, 0.0 to 22.0% cobalt, 6.0 to 16.7% chromium, 0.02 to 0.35% carbon, 0.001 to 0.2% boron, 0.00 to 0.5% zirconium, 0.0 to 3.0% rhenium, 0.0 to 2.0% ruthenium, 0.0 to 3.0% iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 0.1 magnesium, 0.0 to 4.0% iron, 0.0 to 0.5% copper, 0.0 to 1.0% hafnium, the balance being nickel and incidental impurities, wherein the following equations are satisfied in which WNb, and WTa are the weight percent of niobium and tantalum respectively $1.1 \leq 0.3 W_{Nb} + 0.15 W_{Ta}$.

25 Claims, 14 Drawing Sheets

(56) References Cited

U.S. PATENT DOCUMENTS

| | | | |
|---|---|---|---|
| 5,476,555 A | 12/1995 | Erickson | |
| 5,882,586 A | 3/1999 | Tamura et al. | |
| 6,051,083 A * | 4/2000 | Tamaki | B22D 27/045 |
| | | | 148/404 |
| 6,177,046 B1 | 1/2001 | Simkovich et al. | |
| 6,284,392 B1 | 9/2001 | Seth et al. | |
| 6,478,897 B1 | 11/2002 | Izumida et al. | |
| 6,706,241 B1 | 3/2004 | Baumann et al. | |
| 6,908,519 B2 | 6/2005 | Raymond et al. | |
| 7,014,723 B2 | 3/2006 | Beck et al. | |
| 7,854,809 B2 | 12/2010 | Arrell et al. | |
| 9,243,514 B2 | 1/2016 | Krotzer, Jr. et al. | |
| 9,352,421 B2 | 5/2016 | Illston | |
| 9,670,572 B2 | 6/2017 | Etter et al. | |
| 11,180,840 B2 | 11/2021 | Goncharov et al. | |
| 11,459,640 B2 | 10/2022 | Goncharov et al. | |
| 11,634,792 B2 | 4/2023 | Crudden et al. | |
| 2004/0022661 A1 | 2/2004 | Wood et al. | |
| 2004/0177901 A1 | 9/2004 | Yoshinari et al. | |
| 2006/0039817 A1 | 2/2006 | Kelly | |
| 2007/0051199 A1 | 3/2007 | Etuve et al. | |
| 2007/0095441 A1 | 5/2007 | Jiang et al. | |
| 2008/0166258 A1 | 7/2008 | Tanimoto et al. | |
| 2010/0059146 A1 | 3/2010 | Sato et al. | |
| 2010/0296962 A1 | 11/2010 | Hasselqvist et al. | |
| 2010/0329876 A1 | 12/2010 | Bain et al. | |
| 2012/0251307 A1 | 10/2012 | Nishimoto et al. | |
| 2012/0288400 A1 | 11/2012 | Hirata et al. | |
| 2013/0323069 A1 | 12/2013 | Izumi et al. | |
| 2014/0017511 A1 | 1/2014 | Izumi et al. | |
| 2014/0234155 A1 | 8/2014 | Semba et al. | |
| 2015/0197833 A1 | 7/2015 | Kawagishi et al. | |
| 2015/0322557 A1 | 11/2015 | Etter et al. | |
| 2015/0368774 A1 | 12/2015 | Ota et al. | |
| 2016/0002752 A1 | 1/2016 | Srivastava et al. | |
| 2016/0167172 A1 | 6/2016 | Goncharov et al. | |
| 2016/0222490 A1 | 8/2016 | Wright et al. | |
| 2017/0021453 A1 | 1/2017 | Engeli et al. | |
| 2017/0088919 A1 | 3/2017 | Hardy et al. | |
| 2017/0189960 A1 | 7/2017 | Ibe | |
| 2017/0216919 A1 | 8/2017 | Liu et al. | |
| 2017/0342525 A1 | 11/2017 | Takasawa et al. | |
| 2018/0002793 A1 | 1/2018 | Detor et al. | |
| 2018/0002794 A1 | 1/2018 | Detor et al. | |
| 2018/0023176 A1 | 1/2018 | Han et al. | |
| 2018/0057921 A1 | 3/2018 | Kobayashi et al. | |
| 2018/0100223 A1 | 4/2018 | Kobayashi et al. | |
| 2019/0360078 A1 | 11/2019 | Hardy et al. | |

FOREIGN PATENT DOCUMENTS

| | | | |
|---|---|---|---|
| EP | 0709477 | 5/1996 | |
| EP | 0789087 | 8/1997 | |
| EP | 1096033 | 5/2001 | |
| EP | 1193321 | 4/2002 | |
| EP | 1195446 | 4/2002 | |
| EP | 1410872 | 4/2004 | |
| EP | 1502966 | 2/2005 | |
| EP | 1674596 | 6/2006 | |
| EP | 1790750 | 5/2007 | |
| EP | 1813690 | 8/2007 | |
| EP | 1847627 | 10/2007 | |
| EP | 1997921 | 12/2008 | |
| EP | 2071128 | 6/2009 | |
| EP | 2246449 | 11/2010 | |
| EP | 2256222 | 12/2010 | |
| EP | 2298946 | 3/2011 | |
| EP | 2327493 | 6/2011 | |
| EP | 2412833 | 2/2012 | |
| EP | 2530181 | 12/2012 | |
| EP | 2772329 | 9/2014 | |
| EP | 2826877 | 1/2015 | |
| EP | 2894234 | 7/2015 | |
| EP | 3091096 | 11/2016 | |
| EP | 3153271 | 4/2017 | |
| EP | 3159425 | 4/2017 | |
| EP | 3170609 | 5/2017 | |
| EP | 3202931 | 8/2017 | |
| EP | 3208354 | 8/2017 | |
| EP | 3208355 | 8/2017 | |
| EP | 3249063 | 11/2017 | |
| EP | 3257956 | 12/2017 | |
| EP | 3278901 | 2/2018 | |
| EP | 3327157 | 5/2018 | |
| EP | 3327158 | 5/2018 | |
| EP | 3336210 | 6/2018 | |
| EP | 3693105 | 8/2020 | |
| FR | 3013060 | 5/2015 | |
| GB | 1243155 | 8/1971 | |
| GB | 1243155 A * | 8/1971 | C22C 19/00 |
| JP | H09272933 | 10/1997 | |
| JP | H11310839 | 11/1999 | |
| JP | H11310839 A * | 11/1999 | |
| JP | 2003/113434 | 4/2003 | |
| JP | 2004/256840 | 9/2004 | |
| JP | 2008/045176 | 2/2008 | |
| JP | 2009/013450 | 1/2009 | |
| JP | 2009114501 | 5/2009 | |
| JP | 2009/144203 | 7/2009 | |
| JP | 2009/167499 | 7/2009 | |
| JP | 2012/219339 | 11/2012 | |
| JP | 2013/049902 | 3/2013 | |
| JP | 2013/095949 | 5/2013 | |
| JP | 2013216939 | 10/2013 | |
| JP | 2014/122385 | 7/2014 | |
| JP | 2014/210280 | 11/2014 | |
| JP | 2015/117413 | 6/2015 | |
| JP | 2016/000414 | 1/2016 | |
| JP | 2016/037664 | 3/2016 | |
| JP | 2016/056436 | 4/2016 | |
| JP | 2016/196685 | 11/2016 | |
| JP | 2017/179592 | 10/2017 | |
| JP | 2018/123359 | 8/2018 | |
| JP | 2018/145456 | 9/2018 | |
| JP | 2018168400 | 11/2018 | |
| KR | 10-20170058065 | 5/2017 | |
| SE | 328414 | 9/1970 | |
| WO | WO 2004/065645 | 8/2004 | |
| WO | WO 2011/054864 | 5/2011 | |
| WO | WO 2011/062231 | 5/2011 | |
| WO | WO 2013/101692 | 7/2013 | |
| WO | WO 2014/025432 | 2/2014 | |
| WO | WO 2014/124626 | 8/2014 | |
| WO | WO 2014/126086 | 8/2014 | |
| WO | WO 2014/150323 | 9/2014 | |
| WO | WO 2014/165073 | 10/2014 | |
| WO | WO 2015/096980 | 7/2015 | |
| WO | WO 2016/158705 | 10/2016 | |
| WO | WO 2016/209591 | 12/2016 | |
| WO | WO 2017/100169 | 6/2017 | |
| WO | WO2018/036797 | 3/2018 | |
| WO | WO 2018/071328 | 4/2018 | |
| WO | WO 2018/092204 | 5/2018 | |
| WO | WO 2018/151222 | 8/2018 | |
| WO | WO 2018/151262 | 8/2018 | |
| WO | WO 2018/155446 | 8/2018 | |
| WO | WO 2018/181098 | 10/2018 | |
| WO | WO 2018/216067 | 11/2018 | |
| WO | WO 2019/004176 | 1/2019 | |
| WO | WO2019/021015 | 1/2019 | |
| WO | WO 2020/115478 | 6/2020 | |
| WO | WO 2020/245575 | 12/2020 | |

OTHER PUBLICATIONS

Crudden, D.J. et al., "Modelling of influence of alloy composition on flow stress in high-strength nickel-based superalloys", *Acta Materialia*, 75, pp. 356-370, 2014.

Prager et al., *Welding Research Council Bulletin*, pp. 128, 1968.

Ghoussoub et al., "On the Influence of Alloy Chemistry and Processing Conditions on Additive Manufacturability of Ni-Based

(56) References Cited

OTHER PUBLICATIONS

Superalloys" *Superalloys* 2020, The Minerals, Metals & Materials Series, 153-162.
Tang et al., "The Effect of Heat Treatment on Tensile Yielding Response of the New Superalloy ABD-900AM for Additive Manufacturing" *Superalloys* 2020, The Minerals, Metals & Materials Series, 1055-1065.
International Search Report issued in the priority International Application No. PCT/GB2020/051330, dated Aug. 13, 2020.
Search Report issued in the priority United Kingdom Application No. 1908148.8, dated Dec. 5, 2019.
El-Bagoury et al., "Effect of various heat treatment conditions on microstructure of cast polycrystalline IN738LC alloy" Materials Science and Engineering A 2008, 487(1-2), 152-161.
International Search Report and Written Opinion Issued in Corresponding PCT Patent Application No. PCT/GB2018/052124, mailed Nov. 7, 2018.
International Search Report and Written Opinion Issued in Corresponding PCT Patent Application No. PCT/GB2020/052349, dated Nov. 3, 2020.
Search Report Issued in Corresponding United Kingdom Patent Application No. GB1712196.3, dated Feb. 20, 2018.
Office Action issued in corresponding Japanese Application No. 2021-572300, dated Apr. 23, 2024.
Office Action issued in related U.S. Appl. No. 17/766,145, dated Apr. 23, 2024.
Office Action issued in related U.S. Appl. No. 18/117,828, dated May 7, 2024.
Office Communication issued in U.S. Appl. No. 17/766,145, dated Jul. 25, 2024.
Office Action issued in Corresponding Japanese Application No. 2022-520380, dated Nov. 26, 2024 (English Translation provided).

* cited by examiner

NICKEL-BASED ALLOY

CROSS-REFERENCE TO RELATED APPLICATIONS

This application is a national phase application under 35 U.S.C. § 371 of International Application No. PCT/GB2020/051330, filed Jun. 3, 2020, which claims priority to and the benefit of United Kingdom Application No. 1908148.8, filed Jun. 7, 2019. The contents of the referenced patent applications are incorporated into the present application by reference.

FIELD OF THE DISCLOSURE

The present invention relates to a nickel-based superalloy composition designed for application in additive manufacturing (AM) processes, examples of such processes including but not limited to, powder-bed based AM methods (e.g. selective laser melting, electron beam melting), direct metal deposition methods (e.g. powder deposition and wire based methods).

DESCRIPTION OF RELATED ART

Currently, there has been a tendency to migrate nickel-based superalloys which have been successfully manufactured in cast form or wrought form to the AM process. However, this has proven largely inappropriate because many of the material characteristic required for ease of processing in the AM process are not fulfilled by such alloys leading to substantial difficulties in processing and resulting in materials which do not have the expected structural integrity.

In particular there has been significant challenge to develop high volume fraction of γ' alloys for the additive manufacturing process, as these alloys are often classed as 'non-weldable'. Commonly these alloys are processed by investment casting method, examples of common alloys used for the investment casting process are listed in Table 1.

The application of the alloys listed in Table 1 for additive manufacturing methods has been widely studied. It has been shown that although the alloys maybe 'non-weldable' and difficult to process, certain failure mechanisms can be limited. For example these alloys are susceptible to strain-age cracking but careful control during the in-process AM conditions (scan strategy, heat input, etc.) and the post-processing conditions (heat treatment window and heating rate) the risks associated with strain-age cracking can be minimised to some degree. Similarly, strain-age crack resistance can be improved by designing the geometry of the part to reduce the impact of stress-concentrating features such as notches.

Strain-age cracking occurs because of two principal factors: residual strain and γ' precipitation. The magnitude of residual stress may simply be reduced by pre-heating the powder bed, which minimises the temperature range for thermal contraction. It is also shown by Illston (U.S. Pat. No. 9,352,421 B2) that residual stress build-up can be minimised through process control, particularly the use of thin powder layers and deliberately overlapping laser scans, hence allowing for improved printability of high-γ' superalloys. It is also shown by Etter et al (U.S. Pat. No. 9,670,572 B2) that by ramping up particularly quickly to the post-AM stress-relief heat treatment temperature the risk of strain-age cracking can be reduced.

Another mechanism which cannot be as easily mitigated by optimisation of processing is hot cracking. Hot cracking occurs during the last stages of solidification process with a strong dependence on alloy chemistry.

SUMMARY OF THE INVENTION

It is the aim of this invention to develop an alloy of high of γ' volume fraction which is particularly resistant to the mechanism of hot cracking by tailoring the alloy chemistry to overcome this unwanted damage mechanism.

In combination with this improved processability the alloy of the invention preferably has a very high level of oxidation resistance (achieved by having sufficient levels of aluminium to form a protective aluminium-based oxide scale) and also a high level of creep resistance.

TABLE 1

Nominal composition in wt % of conventional high volume fraction of γ' alloys.

| Alloy (wt %) | Al | Co | Cr | Mo | Nb | Ta | Ti | W | C | B | Zr | Hf |
|---|---|---|---|---|---|---|---|---|---|---|---|---|
| IN738 | 3.4 | 8.5 | 16.0 | 1.8 | 0.9 | 1.8 | 3.4 | 2.6 | 0.11 | 0.01 | 0.04 | 0 |
| CM247 | 5.5 | 9.5 | 8.4 | 0.5 | 0.0 | 3.0 | 0.7 | 9.5 | 0.07 | 0.015 | 0.015 | 1.5 |
| IN713 | 6.0 | 0.0 | 12.5 | 4.5 | 2.0 | 0.0 | 0.8 | 0.0 | 0.12 | 0.001 | 0.10 | 0 |
| IN792 | 3.2 | 9.0 | 12.7 | 1.8 | 0.0 | 3.9 | 4.2 | 3.9 | 0.07 | 0.016 | 0.018 | 0 |

The present invention provides a nickel-based alloy composition consisting, in weight percent, of: 4.0 to 5.6% aluminium, 0.0 to 1.0% titanium, 0.0 to 4.0% niobium, 0.0 to 11.9% tantalum, 2.0 to 12.7% tungsten, 0.0 to 3.0% molybdenum, 0.0 to 22.0% cobalt, 6.0 to 16.7% chromium, 0.02 to 0.35% carbon, 0.001 to 0.2% boron, 0.00 to 0.5% zirconium, 0.0 to 3.0% rhenium, 0.0 to 2.0% ruthenium, 0.0 to 3.0% iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 0.1 magnesium, 0.0 to 4.0% iron, 0.0 to 0.5% copper, 0.0 to 1.0% hafnium, the balance being nickel and incidental impurities, wherein the following equations are satisfied in which $W_{Nb}$, and $W_{Ta}$ are the weight percent of niobium and tantalum respectively $$1.1 \leq 0.3 W_{Nb} + 0.15 W_{Ta}$$

Such a nickel based alloy has superior hot cracking resistance as well as reasonable creep resistance, strength, strain age cracking resistance, microstructural stability as well as acceptable freezing range, density and cost.

In an embodiment the following equation is satisfied in which $W_{Nb}$ and $W_{Ta}$ are the weight percent of niobium and tantalum in the alloy respectively $$1.15 \leq 0.3 W_{Nb} 0.15 W_{Ta}$$

or preferably $$1.2 \leq 0.3W_{Nb}+0.15W_{Ta}$$

or more preferably $$1.4 \leq 0.3W_{Nb}+0.15W_{Ta}$$

or even more preferably $$1.8 \leq 0.3W_{Nb}0.15W_{Ta}$$

Such an alloy has further improved hot cracking resistance.

In an embodiment the following equation is satisfied in which $W_{Al}$, $W_{Ti}$, $W_{Nb}$ and $W_{Ta}$ are the weight percent of aluminium, titanium, niobium and tantalum in the alloy respectively $$5.6 \leq W_{Al}+0.5W_{Ti}+0.3W_{Nb}+0.15W_{Ta} \leq 7.0$$

preferably $$5.6 \leq W_{Al}+0.5W_{Ti}+0.3W_{Nb}+0.15W_{Ta} \leq 6.5$$

Such an alloy has improved strain age cracking resistance.

In an embodiment the following equation is satisfied in which $W_W$ and $W_{Mo}$ are the weight percent of tungsten and molybdenum in the alloy respectively $$W_W+0.65W_{Mo} \geq 4.0$$

preferably $$W_W+0.65W_{Mo} \geq 6.0$$

more preferably $$W_W+0.35W_{Mo} \geq 8.0$$

Such an alloy has improved creep resistance.

In an embodiment the nickel-based alloy composition consists of, in weight percent, 8.0% or more chromium, preferably 10.0% or more. Such an alloy has improved oxidation and corrosion resistance.

In an embodiment the nickel-based alloy composition consists of, in weight percent, 14.7% or less chromium, preferably 13.8% or less. Such an alloy has improved microstructural stability.

In an embodiment the nickel-based alloy composition consists of, in weight percent, 9.8 wt % or less tantalum, preferably of 9.2% or less tantalum, more preferably of 7.1% or less tantalum. Such an alloy has reduced density and optionally allows an increased tungsten content which helps increase creep resistance.

In an embodiment the nickel-based alloy composition consists of, in weight percent, 2.0% or less molybdenum, preferably 1.8% or less molybdenum. Such an alloy has improved hot corrosion resistance.

In an embodiment the nickel-based alloy composition consists of, in weight percent, 0.5% or less titanium, preferably 0.1% or less titanium. Such an alloy has better oxidation resistance.

In an embodiment the nickel-based alloy composition consists of, in weight percent, 10.7 or less tungsten, preferably 8.7% or less tungsten. Such an alloy has improved microstructural stability.

In an embodiment the nickel-based alloy composition consists of, in weight percent, 3.0% or less niobium. Such an alloy has improved oxidation resistance.

In an embodiment the nickel-based alloy composition consists of, in weight percent, 0.5% or less of one or both of platinum and palladium. Such an alloy has lower cost.

In an embodiment the nickel-based alloy composition consists of, in weight percent, 4.5% or more aluminium. Such an alloy has improved corrosion resistance.

In an embodiment the nickel-based alloy composition consists of, in weight percent, 5.3% or less aluminium, preferably of 5.1% or less aluminium, more preferably of 4.6% or less aluminium. The strain age cracking and resistance are improved in such an alloy in combination with improved hot cracking resistance.

In an embodiment the nickel-based alloy composition consists of, in weight percent, 15.0% or less cobalt. Such an alloy has a lower freezing range.

In an embodiment the nickel-based alloy composition consists of, in weight percent 1.1 wt % or more tantalum, preferably of 3.7% or more tantalum, more preferably of 5.8% or more tantalum. Such an alloy allows the amount of niobium to be reduced without reduction in hot cracking resistance, or in combination with higher levels of niobium, improves hot cracking resistance yet further.

In an embodiment the nickel-based alloy composition consists of, in weight percent 2.7 wt % or more tungsten, preferably of 2.8% or more tungsten, more preferably of 4.7% or more tungsten, even more preferably of 5.1% or more tungsten, most preferably of 5.2% or more tungsten.

Such an alloy has improved creep resistance.

In an embodiment the following equation is satisfied in which $W_{Ta}$ and $W_W$ are the weight percent of tantalum and tungsten in the alloy respectively $$W_W+W_{Ta} \leq 13.9$$

preferably $$W_W W_{Ta} \leq 11.8$$

Such an alloy has reduced density.

In an embodiment the following equation is satisfied in which $W_{Cr}$, $W_{Mo}$ and $W_W$ are the weight percent of chromium, molybdenum and tungsten in the alloy respectively $$W_W+W_{Cr}+1.7W_{Mo} \leq 18.7$$

preferably $$W_W+W_{Cr}+1.7W_{Mo} \leq 17.8$$

Such an alloy has improved microstructural stability.

DETAILED DESCRIPTION OF THE INVENTION

Figure 1:
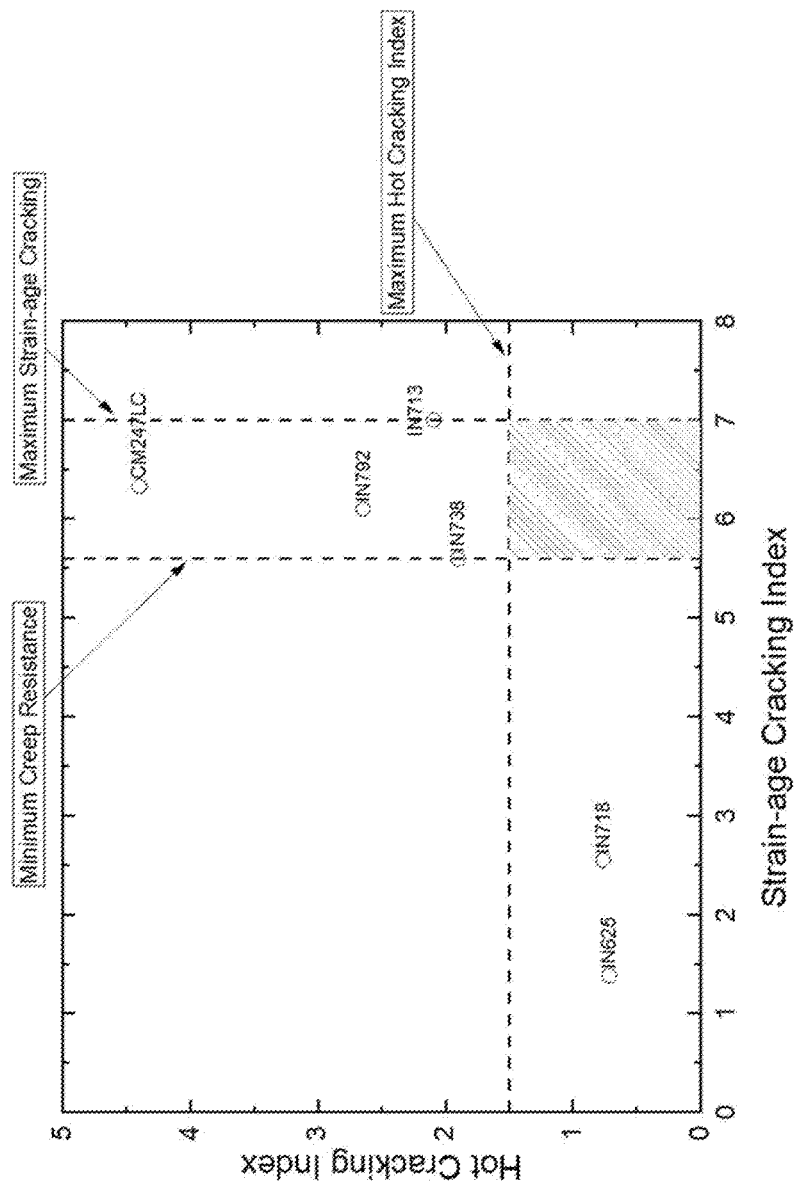
FIG. 1 shows the calculated values for strain age merit index and hot cracking index for a number of commercially used superalloys (including alloys listed in Table 1), limits for creep resistance, stain age cracking and hot cracking are identified, the target area for the invention is shaded.

Traditionally, nickel-based superalloys have been designed through empiricism. Thus their chemical compositions have been isolated using time consuming and expensive experimental development, involving small-scale processing of limited quantities of material and subsequent characterisation of their behaviour. The alloy composition adopted is then the one found to display the best, or most desirable, combination of properties. The large number of possible alloying elements indicates that these alloys are not entirely optimised and that improved alloys are likely to exist.

In superalloys, generally additions of chromium (Cr) and aluminium (Al) are added to impart resistance to oxidation/corrosion, cobalt (Co) is added to improve resistance to sulphidisation. For creep resistance, molybdenum (Mo), tungsten (W), cobalt are introduced, because these retard the thermally-activated processes—such as, dislocation climb—which determine the rate of creep deformation. To promote static and cyclic strength, aluminium (Al), tantalum (Ta), niobium (Nb) and titanium (Ti) are introduced as these promote the formation of the precipitate hardening phase gamma-prime ($\gamma'$). This precipitate phase is coherent with the face-centred cubic (FCC) matrix phase which is referred to as gamma ($\gamma$).

A modelling-based approach used for the isolation of new grades of nickel-based superalloys is described here, termed the "Alloys-By-Design" (ABD) method. This approach utilises a framework of computational materials models to estimate design relevant properties across a very broad compositional space. In principle, this alloy design tool allows the so-called inverse problem to be solved; identifying optimum alloy compositions that best satisfy a specified set of design constraints.

The first step in the design process is the definition of an elemental list along with the associated upper and lower compositional limits. The compositional limits for each of the elemental additions considered in this invention—referred to as the "alloy design space"—are detailed in Table 2.

TABLE 2

Alloys design space in wt % searched using the "Alloys-by-Design" method.

| Alloy (wt %) | Al | Co | Cr | Mo | Nb | Ta | Ti | W |
|---|---|---|---|---|---|---|---|---|
| Min | 2.0 | 0.0 | 2.0 | 0.0 | 0.0 | 0.0 | 0.0 | 0.0 |
| Max | 10.0 | 25.0 | 18.0 | 8.0 | 6.0 | 14.0 | 4.0 | 16.0 |

The balance is nickel. The levels of carbon, boron and zirconium where fixed at 0.06%, 0.015% and 0.06% respectively.

The second step relies upon thermodynamic calculations used to calculate the phase diagram and thermodynamic properties for a specific alloy composition. Often this is referred to as the CALPHAD method (CALculation of PHAse Diagrams). These calculations are conducted at the typical service temperature for the new alloy (900° C.), providing information about the phase equilibrium (microstructure).

A third stage involves isolating alloy compositions which have the desired microstructural architecture. In the case of nickel-based superalloys which require superior resistance to creep deformation, the creep rupture life generally improves as the volume fraction of the precipitate hardening phase $\gamma'$ is increased, the most beneficial range for volume fraction of $\gamma'$ lies between 60%-70%. At values above 70% volume fraction of $\gamma'$ a reduction in creep resistance is observed.

It is also necessary that the $\gamma/\gamma'$ lattice misfit should conform to a small value, either positive or negative, since coherency is otherwise lost; thus limits are placed on its magnitude. The lattice misfit δ is defined as the mismatch between γ and γ′ phases, and is determined according to $$\delta = \frac{2(a_{\gamma'} - a_\gamma)}{a_{\gamma'} + a_\gamma} \quad (1)$$

where $\alpha_\gamma$ and $\alpha_{\gamma'}$ are the lattice parameters of the γ and γ′ phases.

Rejection of alloy on the basis of unsuitable microstructural architecture is also made from estimates of susceptibility to topologically close-packed (TCP) phases. The present calculations predict the formation of the deleterious TCP phases sigma (σ), P and mu (μ) using CALPHAD modelling.

Thus the model isolates all compositions in the design space which are calculated to result in a desired volume fraction of γ′, which have a lattice misfit γ′ of less than a predetermined magnitude and have a total volume fraction of TCP phases below a predetermined magnitude.

In the fourth stage, merit indices are estimated for the remaining isolated alloy compositions in the dataset. Examples of these include: creep-merit index (which describes an alloy's creep resistance based solely on mean composition), strength-merit index (which describes an alloy's precipitation yield strength based solely on mean composition), solid-solution merit index (which describes an alloy's solid solution yield strength based solely on mean composition), density and cost.

In the fifth stage, the calculated merit indices are compared with limits for required behaviour, these design constraints are considered to be the boundary conditions to the problem. All compositions which do not fulfil the boundary conditions are excluded. At this stage, the trial dataset will be reduced in size quite markedly.

The final, sixth stage involves analysing the dataset of remaining compositions. This can be done in various ways. One can sort through the database for alloys which exhibit maximal values of the merit indices—the lightest, the most creep resistant, the most oxidation resistant, and the cheapest for example. Or alternatively, one can use the database to determine the relative trade-offs in performance which arise from different combination of properties.

The example seven merit indices are now described.

The first merit index is the creep merit index. The overarching observation is that time-dependent deformation (i.e. creep) of a nickel-based superalloy occurs by dislocation creep with the initial activity being restricted to the γ phase. Thus, because the fraction of the γ′ phase is large, dislocation segments rapidly become pinned at the γ/γ′ interfaces. The rate-controlling step is then the escape of trapped configurations of dislocations from γ/γ′ interfaces, and it is the dependence of this on local chemistry—in this case composition of the γ phase—which gives rise to a significant influence of alloy composition on creep properties.

A physically-based microstructure model can be invoked for the rate of accumulation of creep strain $\dot{\epsilon}$ when loading is uniaxial and along the ⟨001⟩ crystallographic direction. The equation set is $$\dot{\epsilon}_{\langle 001 \rangle} = \frac{16}{\sqrt{6}} \rho_m \phi_p D_{\mathit{eff}} (1-\phi_p)\left(1/\phi_p^{1/3} - 1\right)\sinh\left\{\frac{\sigma b^2 \omega}{\sqrt{6} K_{CF} kT}\right\} \quad (2)$$

$$\dot{\rho}_m = C\dot{\epsilon}_{\langle 001 \rangle} \quad (3)$$

where $\rho_m$ is the mobile dislocation density, $\phi_p$ is the volume fraction of the γ′ phase, and ω is width of the matrix channels. The terms σ and T are the applied stress and temperature, respectively. The terms b and k are the Burgers vector and Boltzmann constant, respectively. The term $K_{CF}=1+2\phi_p^{1/3}3/\sqrt{3\pi}(1-\phi_p^{1/3})$ is a constraint factor, which accounts for the close proximity of the cuboidal particles in these alloys. Equation 3 describes the dislocation multiplication process which needs an estimate of the multiplication parameter C and the initial dislocation density. The term $D_{\mathit{eff}}$ is the effective diffusivity controlling the climb processes at the particle/matrix interfaces.

Note that in the above, the composition dependence arises from the two terms $\phi_p$ and $D_{\mathit{eff}}$. Thus, provided that the microstructural architecture is assumed constant (microstructural architecture is mostly controlled by heat treatment) so that $\phi_p$ is fixed, any dependence upon chemical composition arises through $D_{\mathit{eff}}$. For the purposes of the alloy design modelling described here, it turns out to be unnecessary to implement a full integration of Equations 2 and 3 for each prototype alloy composition. Instead, a first order merit index $M_{creep}$ is employed which needs to be maximised, which is given by $$M_{creep} = \sum_i x_i / \tilde{D}_i \quad (4)$$

where $x_i$ is the atomic fraction of solute i in the γ phase and $\tilde{D}_i$ is the appropriate interdiffusion coefficient.

The second merit index is for strength merit index. For high nickel-based superalloys, the vast majority of strength comes from the precipitate phase. Therefore, optimising alloy composition for maximal precipitate strengthening is a critical design consideration. From hardening theory, a merit index for strength, $M_{strength}$, is proposed. The index considers the maximum possible precipitate strength—determined to be the point where the transition from weakly coupled to strongly coupled dislocation shearing occurs—which can be approximated using, $$M_{strength} = \overline{M} \cdot \sqrt{2}\gamma_{APB} \varnothing_p^{1/2} / b \quad (5)$$

Where $\overline{M}$ is the Taylor factor, $\gamma_{APB}$ is the anti-phase boundary (APB) energy, $\phi_p$ is the volume fraction of the γ′ phase and b is the Burgers vector.

From Equation 5 it is apparent that fault energies in the γ′ phase—for example, the anti-phase boundary APB energy—have a significant influence on the deformation behaviour of nickel-based superalloys. Increasing the APB energy has been found to improve mechanical properties including, tensile strength and resistance to creep deformation. The APB energy was studied for a number of Ni—Al—X systems using density functional theory. From this work the effect of ternary elements on the APB energy of the γ′ phase was calculated, linear superposition of the effect for each ternary addition was assumed when considering complex multicomponent systems, resulting in the following equation, $$\gamma_{APB}=195-1.7x_{Cr}-1.7x_{Mo}+4.6x_W+27.1x_{Ta}+21.4x_{Nb}+15x_{Ti} \quad (6)$$

where, $x_{Cr}$, $x_{Mo}$, $x_W$, $x_{Ta}$, $x_{Nb}$ and $x_{Ti}$ represent the concentrations, in atomic percent, of chromium, molybdenum, tungsten, tantalum, niobium and titanium in the $\gamma'$ phase, respectively. The composition of the $\gamma'$ phase is determined from phase equilibrium calculations.

The third merit index is density. The density, $\rho$, was calculated using a simple rule of mixtures and a correctional factor, where, $\rho$, is the density for a given element and $x_i$ is the atomic fraction of the alloy element.

$$\rho=1.05[\Sigma_i x_i \rho_i] \quad (7)$$

The fourth merit index was cost. In order to estimate the cost of each alloy a simple rule of mixtures was applied, where the weight fraction of the alloy element, $x_i$, was multiplied by the current (2016) raw material cost for the alloying element, $c_i$.

$$\text{Cost}=\Sigma_i x_i c_i \quad (8)$$

The estimates assume that processing costs are identical for all alloys, i.e. that the product yield is not affected by composition.

A fifth merit index is based upon rejection of candidate alloys on the basis of unsuitable microstructural architecture made on the basis of susceptibility to TCP phases. To do this use is made of the d-orbital energy levels of the alloying elements (referred as Md) to determine the total effective Md level according to $$\overline{M_d}=\Sigma_i x_i Md_i \quad (9)$$

where the $x_i$ represents the mole fraction of the element i in the alloy. Higher values of Md are indicative of higher probability of TCP formation.

The sixth merit index is a strain age cracking index. The ability of an alloy to be processed by additive manufacturing is related to the chemical composition. The index is developed from the empirical observations which relate alloy composition to the weldability of nickel-based superalloys in terms of susceptibility to strain age cracking. In this relationship a factor of 0.5 is added to the titanium content to convert this to an "aluminium equivalent" as titanium has approximately twice the density of aluminium. In effect the additive manufacturing process for metallic alloys is a continuous welding process. There has been adaption of previous observations which only relate weldability to aluminium and titanium content. A modification is included to account for the influence of tantalum and niobium, which behave in a similar manner to aluminium and titanium during alloy aging. Similar to titanium a constant is added to convert these elemental additions to an "aluminium equivalent", thus, niobium and tantalum have correctional factors (determined from their density relative to aluminium) of 0.3 and 0.15 respectively. The strain age index is applied via the following equation.

$$M_{strain-age}=(W_{Al}+0.5W_{Ti}+0.3W_{Nb}+0.15W_{Ta}) \quad (10)$$

where $W_{Al}$, $W_{Ti}$, $W_{Nb}$, and $W_{Ta}$ the weight percent of aluminium, titanium, niobium and tantalum in the alloy by weight percent. A lower value of this strain age index indicates a better response to the additive manufacture process.

A seventh merit index is based on the solidification behaviour of candidate alloys as predicted by the Scheil-Gulliver model, in order to rank susceptibility to hot cracking based on composition. In this approach the temperature range of the terminal stage of solidification, between 90% and 99% fraction solid, is taken to represent the region where an alloy is vulnerable to hot cracking, as it is in this phase that liquid feeding is likely to be restricted by bridged networks of solid material. The temperature range of 40% to 90% of solid fraction is considered to be the safe region, since liquid feeding is far less restricted in this stage; the temperature range before 40% fraction solid is not considered to be relevant because liquid is still the predominant phase.

According to the ranking system used by Clyne and Davis for alloy castings, the hot cracking index is defined as the ratio of the vulnerable temperature range to the safe temperature range, as follows:

$$HCI = \frac{T_{90} - T_{99}}{T_{40} - T_{90}} \quad (11)$$

Lower values of this index correspond to a lower risk of hot cracking.

The ABD method described above was used to isolate the inventive alloy composition. The design intent for this alloy is to develop a highly creep resistant superalloy—achieved by having a high volume fraction of $\gamma'$—combined with improved processability by additive manufacturing compared to other high volume $\gamma'$ alloys—achieved by having an improved resistance to strain age cracking and to the mechanism of hot cracking. Alongside these attributes a good resistance to oxidation is achieved by having sufficient levels of aluminium to form a protective aluminium-based oxide scale and other key material properties including microstructural stability and alloy density are optimised.

The material properties—determined using the ABD method—for the typical compositions, listed in Table 1, are listed in Table 3. The design of the new alloy was considered in relation to the predicted properties listed for these alloys.

The rationale for the design of the new alloy is now described.

TABLE 3

Calculated phase fractions and merit indices made with the "Alloys-by-Design" software. Results for nickel-based superalloys listed in Table 1.

| Alloy | $\gamma'$ | Creep Merit Index ($m^{-2}s \times 10^{-15}$) | Density (g/cm³) | $\gamma/\gamma'$ Misfit (%) | Strength Merit Index (Mpa) | Md (eV) | Strain Age Index | Hot Cracking Index | Freezing Range (° C.) | Cost $/Kg |
|---|---|---|---|---|---|---|---|---|---|---|
| IN738 | 0.45 | 5.9 | 8.3 | 0.16 | 1517 | 0.92 | 5.6 | 1.82 | 259 | 5.54 |
| CM247LC | 0.59 | 8.0 | 8.6 | −0.05 | 1243 | 0.92 | 6.3 | 4.44 | 606 | 10.63 |
| IN713 | 0.55 | 5.8 | 8.0 | −0.35 | 1139 | 0.93 | 7.0 | 2.03 | 213 | 2.59 |
| IN792 | 0.51 | 6.5 | 8.5 | 0.17 | 1702 | 0.92 | 5.9 | 2.05 | 269 | 7.54 |

Alloys with a high strain-age cracking index are known from welding literature to be difficult to process, and the same trends are generally observed in AM. Reducing the strain-age merit index lowers the propensity to this failure mechanism, however, high-temperature strength (in terms of creep strength and tensile strength) and oxidation resistance (in terms of protective oxide scale formed) are dependent on a relatively high content of γ'-forming elements which makes avoiding a high strain-age index difficult. To overcome this strain-age cracking can be managed in other ways. For example, carefully controlling the in-process AM conditions (scan strategy, heat input, etc.) and the post-processing conditions (heat treatment window and heating rate) can limit the risks associated with strain-age cracking. Similarly, the risk of strain-age crack can be reduced by designing the geometry of the components in way which reduces stress-concentrating features that result in localised strain age cracking. See for example U.S. Pat. Nos. 9,352,421 B2 and 9,670,572 B2.

Unlike strain age cracking another manufacturing defect which can arise during the additive manufacturing process is hot cracking. Hot cracking may happen during the solidification process. The mechanism of this manufacturing defect is driven by changes in liquid composition during solidification of the alloy. The risk of hot cracking occurring cannot be managed in the same way as strain age cracking. Carefully controlling the in-process AM conditions may help to some degree, however, the use of post processing or design changes will not influence this mechanism for example. The most direct way to improve resistance to hot cracking is by modification of alloy chemistry. Improving the resistance to hot cracking substantially improves the processability of an alloy for additive manufacturing even when a high strain-age cracking index must be tolerated. It is the aim of this invention to isolate alloys which have low values of hot cracking index relative to other alloys and which have a high strain age index in a range in which strain-age cracking can be managed by processing conditions, see FIG. 1.

Figure 2:
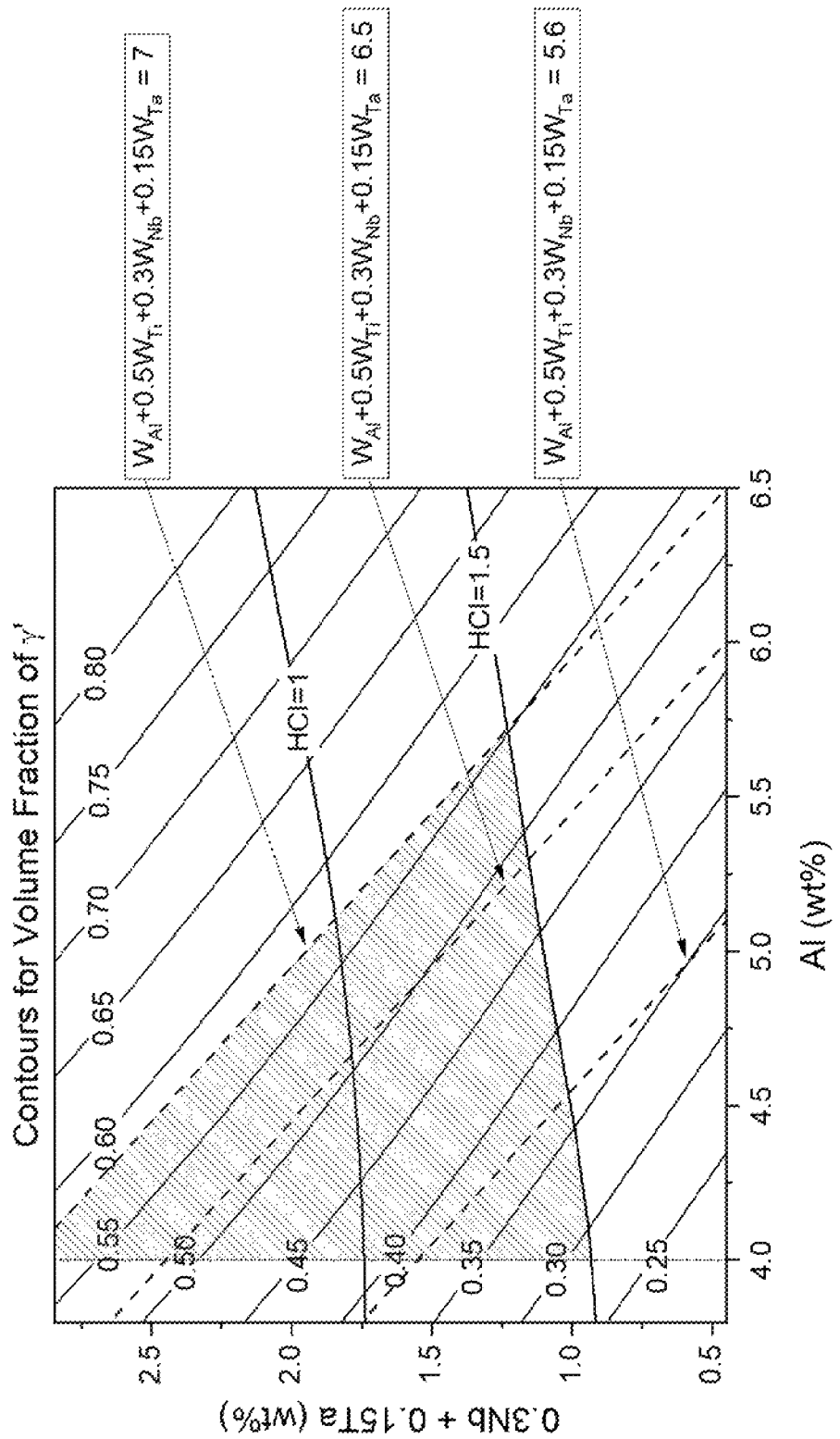
FIG. 2 is a contour plot showing the effect of γ' forming elements aluminium and niobium plus tantalum (according to the relationship $0.3W_{Nb}+0.15W_{Ta}$) on volume fraction of γ' when titanium content is fixed at 0.0 wt % for alloys within the alloy design space, determined from phase equilibrium calculations conducted at 900° C. Delineated on the graph are different limits for strain age index and hot cracking index.

FIG. 2 describes the relationship between the addition of elements aluminium, niobium and tantalum which are predominantly added to form the γ' phase and control the volume fraction of γ'.

The elements which form the γ' phase may reduce the ease by which an alloy can be processed by AM due to an increasing strain age merit index (Equation 10). Thus the combination of these elements must be optimised to provide the desired balance between limiting likelihood of strain age cracking during AM processing and volume fraction of γ' (which provides strength in terms of creep resistance and tensile strength.).

To achieve the preferred strain age cracking index the aluminium, titanium, niobium and tantalum content must satisfy the following constraint $$f(SAC)=W_{Al}+0.5W_{Ti}+0.3W_{Nb}+0.15W_{Ta}$$

where, f(SAC) is a numerical value of 7.0 or less and $W_{Al}$, $W_{Ti}$, $W_{Nb}$ and $W_{Ta}$ are the weight percent of aluminium, titanium, niobium and tantalum in the alloy respectively. A value of 7.0 or less is selected to be equivalent or better than alloy IN713C, see Table 3. Values for f(SAC) greater than 7 are less preferable because they limit the processing of the alloy in terms of strain age cracking. It is preferable to lower the strain age merit index, to enable easier processing by AM, so preferably $W_{Al}+0.5W_{Ti}+0.3W_{Ta} \leq 6.5$.

The intended application temperature for this new alloy is up to temperatures of 1000° C. in highly oxidising and corrosive environments. Examples of the application areas include hot sections of a gas turbine engine or within the exhaust system of an internal combustion engine.

To achieve desirable oxidation performance it is desired that the alloy of the invention must form a protective aluminium-based oxide scale ($Al_2O_3$), as such oxides are stable at and above 1000° C. as opposed to those based on $Cr_2O_3$. Alloys such as IN738 and IN792 have a relatively high volume fraction of γ' and very good creep resistance but their relatively low aluminium content—3.4 wt % and 3.2 wt %, respectively—means they are unable to form an aluminium-based protective oxide scale, instead they form a less protective chromium based oxide scale. An aluminium-based oxide scale has better adhesion and thermal stability in comparison to chromium-based protective oxide scales which may encounter chromium volatisation at temperatures close to 1000° C., resulting in a less protective oxide. To produce an aluminium-based protective oxide scale an aluminium content of at least 4.0 wt % is required, more preferably 4.5 wt % or more as this further improves the formation of the alumina scale providing better oxidation resistance.

Alloying additions of titanium are known to decrease oxidation performance due to the formation of titanium oxides. This has been found to be significantly deleterious to the oxidation performance. For the alloy of the invention titanium use is limited to 1.0 wt %, preferably 0.5 wt % and most preferably 0.1 wt % due to its negative influence on high temperature oxidation resistance. Titanium also has a relatively high co-efficient for strain age cracking (Equation 10) so it is beneficial to limit titanium to reduce propensity to strain age cracking. On the other hand a minimum amount of titanium of 0.1 wt % restricts density and can advantageously encourage carbide formation.

Alloying additions of niobium are also known to negatively influence oxidation. This is because niobium forms grain boundary carbides which are particularly detrimental for oxidation assisted cracking mechanisms in which damage may accumulate along grain boundaries, such as under low cycle fatigue, creep-fatigue conditions or during high temperature creep. However, additions of niobium are beneficial for improving resistance to hot cracking resistance (discussed later with reference to FIG. 3) so its use is limited to 4.0 wt %, more preferably 3.0 wt % or less.

Figure 4:
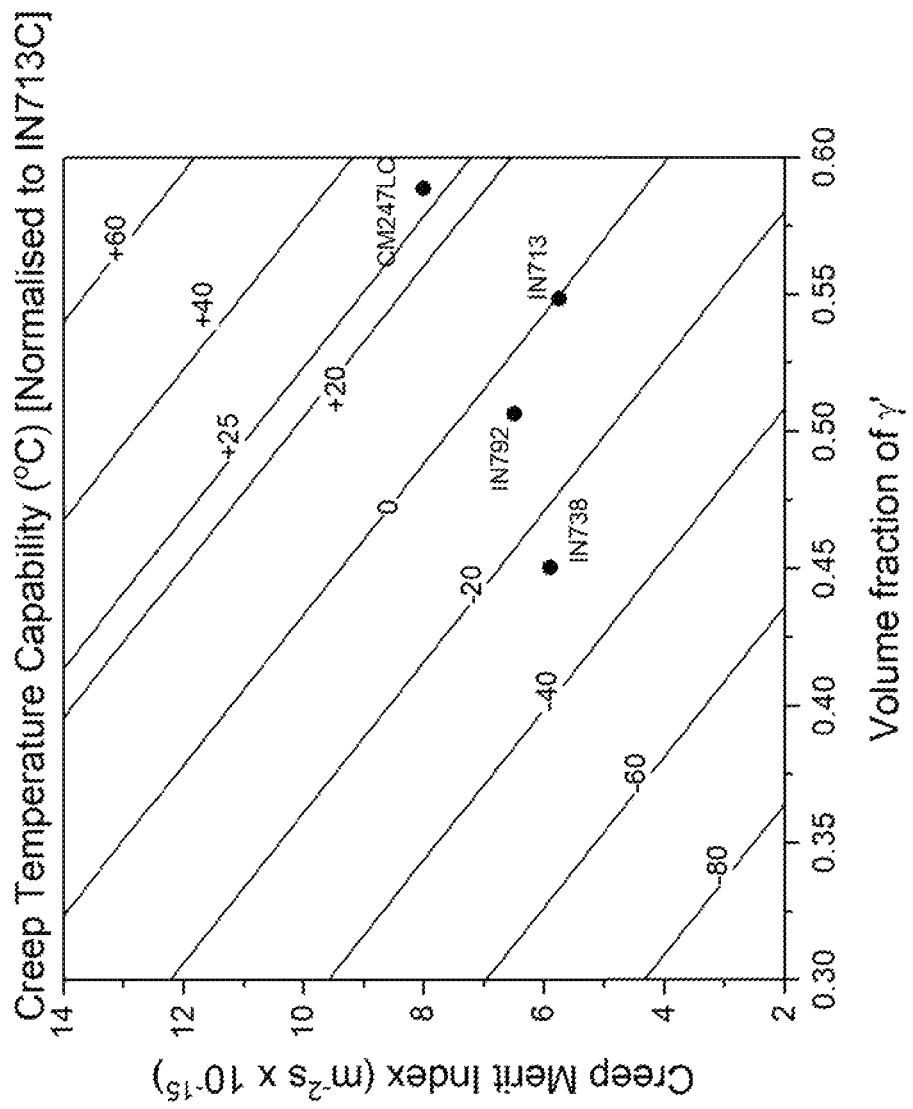
FIG. 4 is a contour plot showing the effect of γ' volume fraction and creep merit index on creep temperature capability, contours have been normalised to IN713C alloy, the predicted position for alloys listed in Table 1 is shown.

Additions of chromium will promote the formation a protective alumina oxide scale. Chromium in particular is desirable for improving resistance to hot corrosion. Alloys such as IN738 and IN792 have relatively high level of chromium—16.0 wt % and 12.7 wt %, respectively—this is primarily for resistance to hot corrosion, however, the maximum operating temperature is limited as they have poor oxidation kinetics at very high temperatures as they do not form protective aluminium-based oxides. The upper limit of operating temperature for these alloys is also limited as they have a lower resistance to creep relative to IN713C (FIG. 4). The alloy of this invention requires a chromium content of 6.0 wt % or greater. A chromium level of 6.0 wt % or greater is desirable in order to achieve a good level of hot corrosion resistance. More preferably the chromium content is 8.0 wt % or greater as this provides hot corrosion resistance equivalent to CM247LC. Even more preferably chromium is present in an amount of 10.0% or greater this increases the corrosion resistance in comparison to alloy CM247LC even further.

Molybdenum is known to reduce the hot corrosion resistance of nickel superalloys significantly. As such molybdenum is an optional addition but a preferred minimum on 0.1 wt % or more or even 0.5 wt % or more helps reduce hot corrosion resistance. To achieve a good level of corrosion resistance it preferable to limit molybdenum to 3.0 wt % or less. More preferably molybdenum is limited to 2.0 wt % or less. Most preferably molybdenum is limited to 1.8 wt % or less as alloys IN738 and IN792 are known to have a very good resistance to corrosion.

Based upon the minimum content for aluminium (4.0 wt %) and the desirability for f(SAC)<7, as well as the preference to limit the alloy to less than 0.1 wt % titanium (e.g 0.0 wt %), it is necessary to limit the sum of the elements tantalum and niobium according to the relationship $0.3W_{Nb}+0.15W_{Ta}$ to 3.0 or less. Therefore, the maximum limits of niobium and tantalum should be 9.7 wt % and 20.0 wt % respectively. Preferably for an improved balance of oxidation resistance (aluminium 4.5 wt % or greater) and strain age cracking resistance (f(SAC)<6.5) $0.3W_{Nb}+0.15W_{Ta}$ is limited to 2.5 or less. Therefore the maximum limit of niobium and tantalum should more preferably be 8.1 wt % and 16.6 wt % respectively. Most preferably a balance of resistance to strain age cracking and oxidation resistance is achieved when aluminium is 5.0 wt % and f(SAC)<6.5, therefore it is most preferable to limit $0.3W_{Nb}+0.15W_{Ta}$ to 2.0 or less. Therefore the maximum limit of niobium and tantalum should be 6.5 wt % and 13.3 wt % respectively. However as will be explained later, the alloy of the present invention actually requires even lower levels of niobium and tantalum. For the most preferred level of tantalum of 7.1 wt % or less, niobium becomes a mandatory element in order that the required hot cracking index is achieved. A level of niobium of 0.05 wt % or more or 0.5 wt % or more or even 1.0 wt % or more is desired in order to improve hot cracking resistance. All of the examples below have at least such a level of niobium.

Plotted on FIG. 2 are dotted lines depicting different limits for strain age cracking. It is seen that to produce an alloy which has a strain age index of less than 7 it is preferable that the γ' volume fraction is limited to 0.63 at an equilibrium temperature of 900° C. Preferably the volume fraction of γ' volume fraction is limited to 0.56 based on the more preferred value for strain age index $W_{Al}+0.5W_{Ti}+0.3W_{Nb}0.15W_{Ta} \leq 6.5$.

Figure 5:
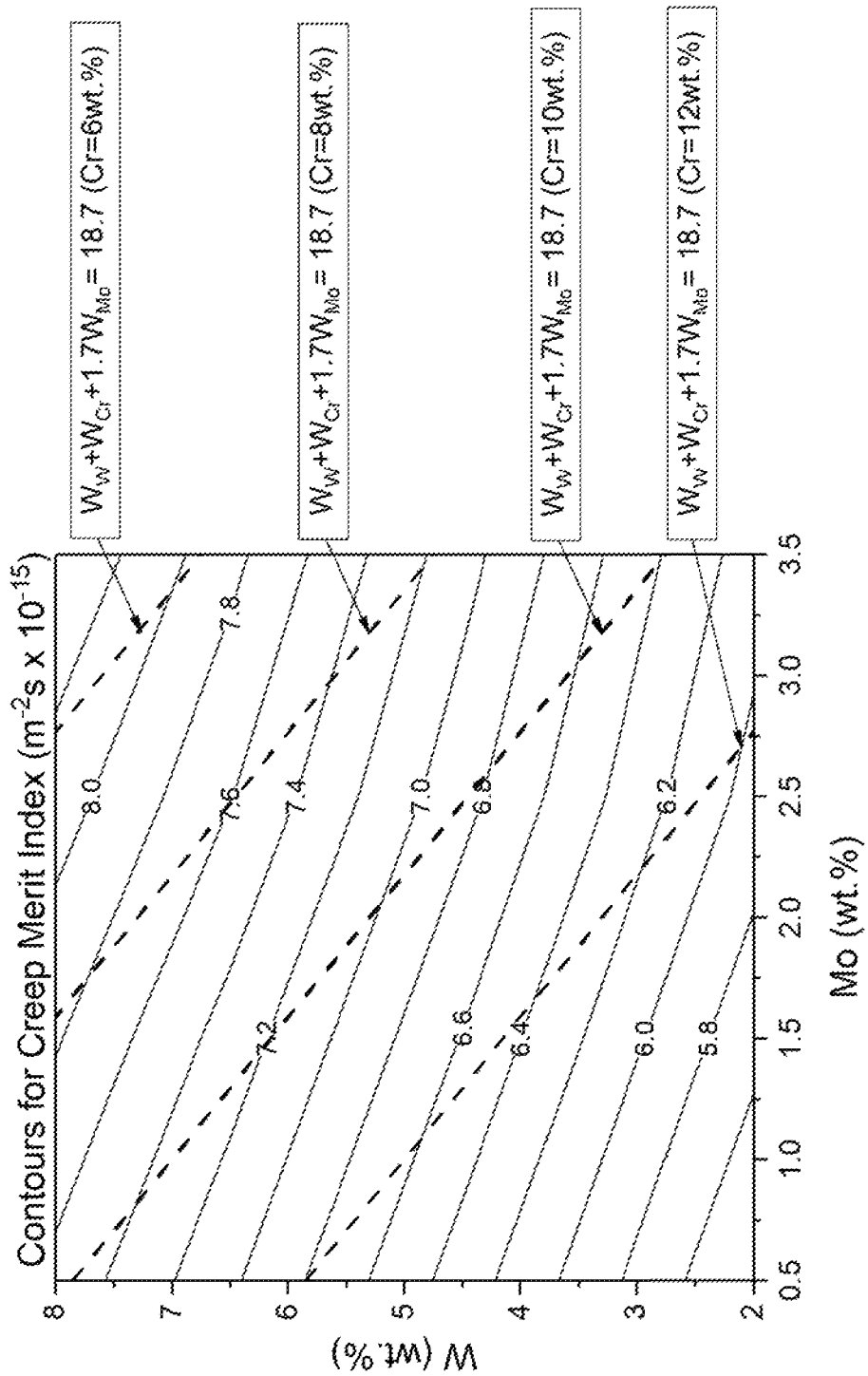
FIG. 5 is a contour plot showing the effect of elements molybdenum and tungsten on creep merit index, delineated on the graph are limits for stability at different concentrations of chromium.
Figure 6:
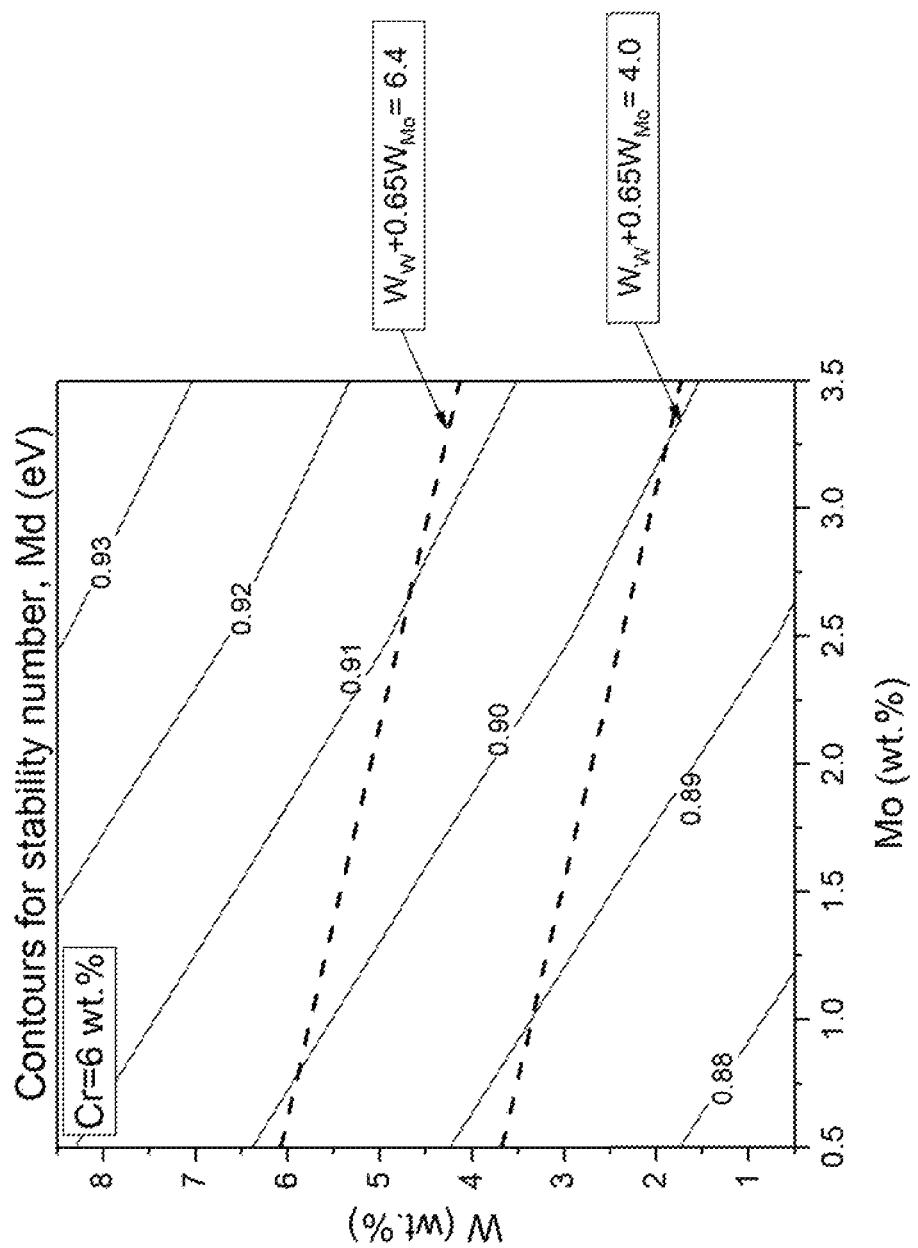
FIG. 6 is a contour plot showing the effect of elements molybdenum and tungsten on alloy stability (in terms of Md number) when the chromium content is fixed at 6.0 wt %, delineated on the graph are different levels for creep merit index.
Figure 7:
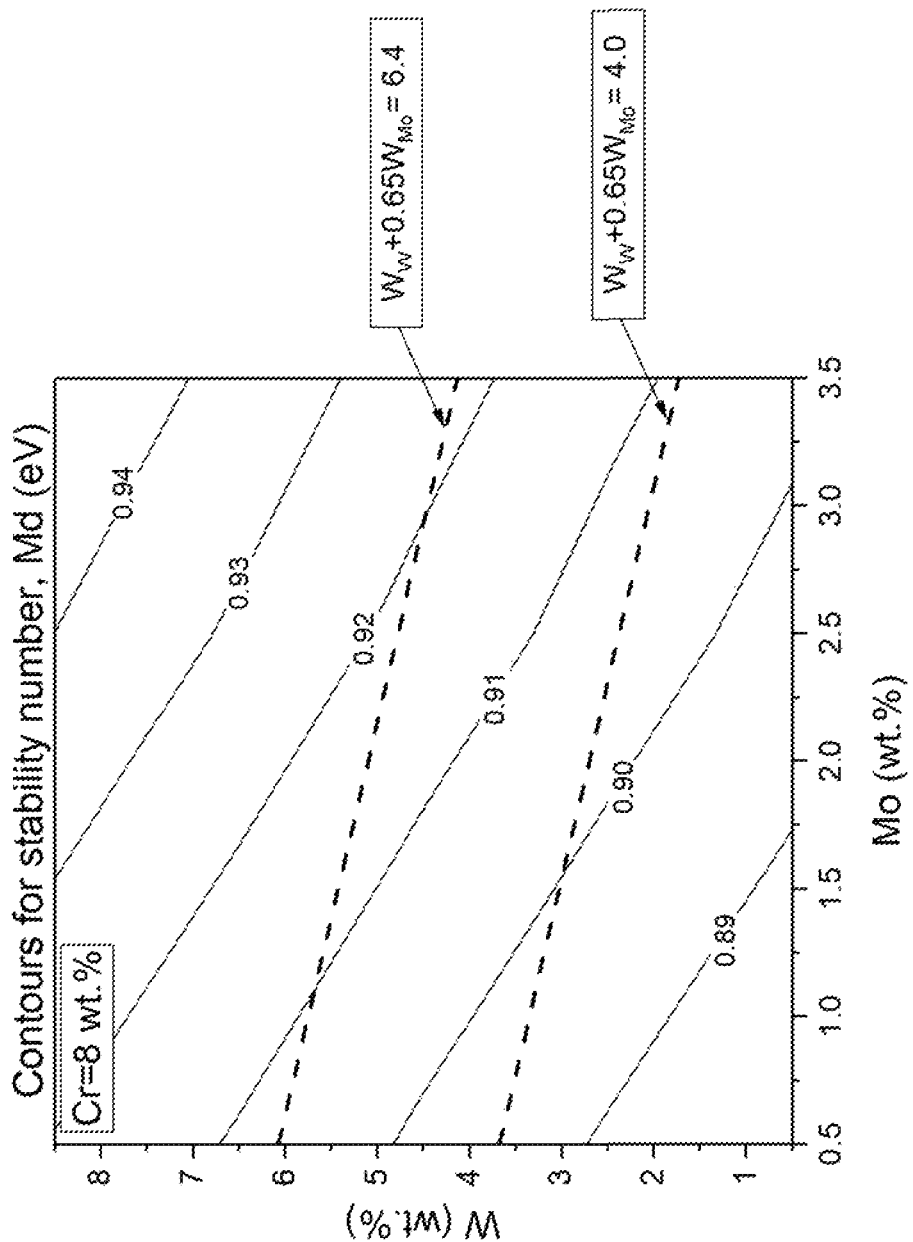
FIG. 7 is a contour plot showing the effect of elements molybdenum and tungsten on alloy stability (in terms of Md number) when the chromium content is fixed at 8.0 wt %, delineated on the graph are different levels for creep merit index.
Figure 8:
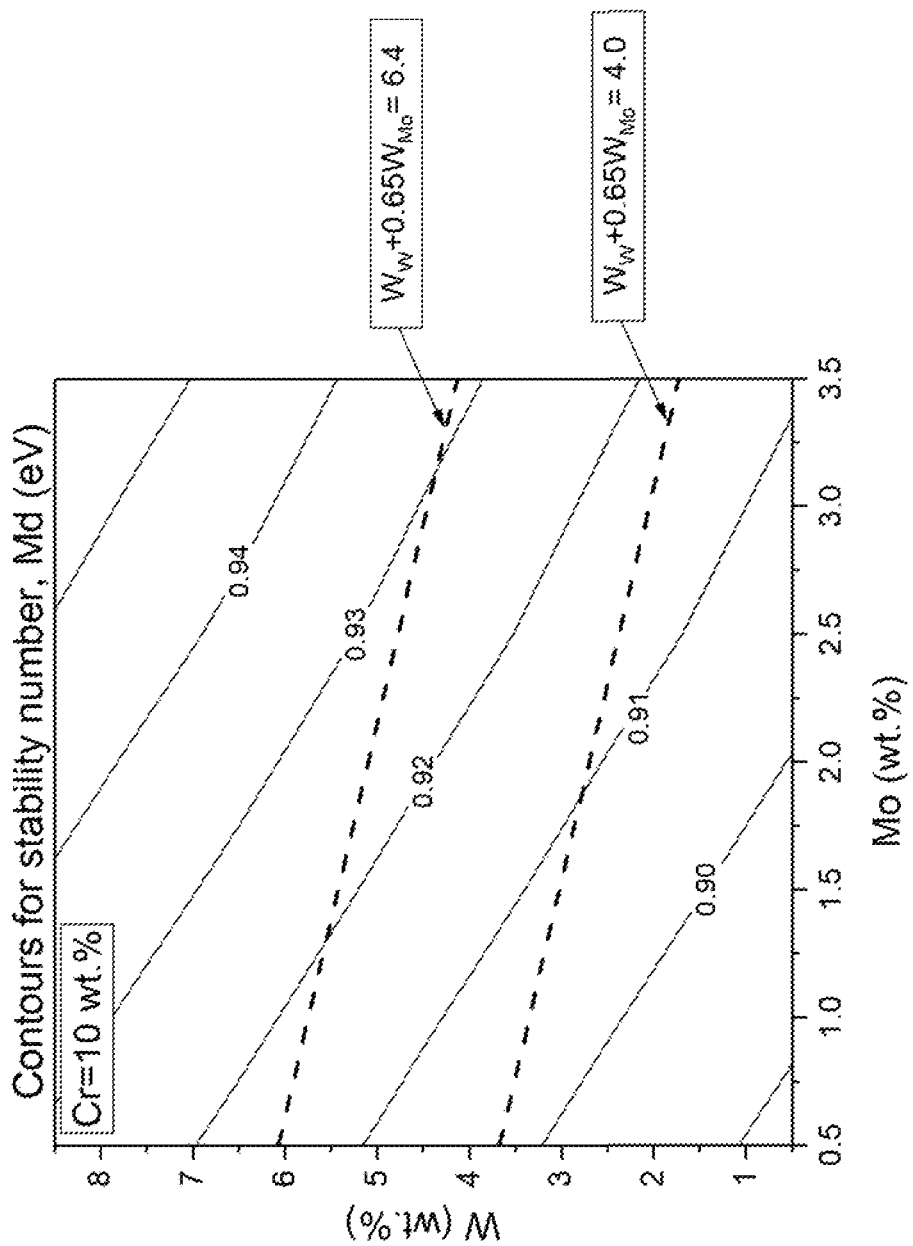
FIG. 8 is a contour plot showing the effect of elements molybdenum and tungsten on alloy stability (in terms of Md number) when the chromium content is fixed at 10.0 wt %, delineated on the graph are different levels for creep merit index.
Figure 9:
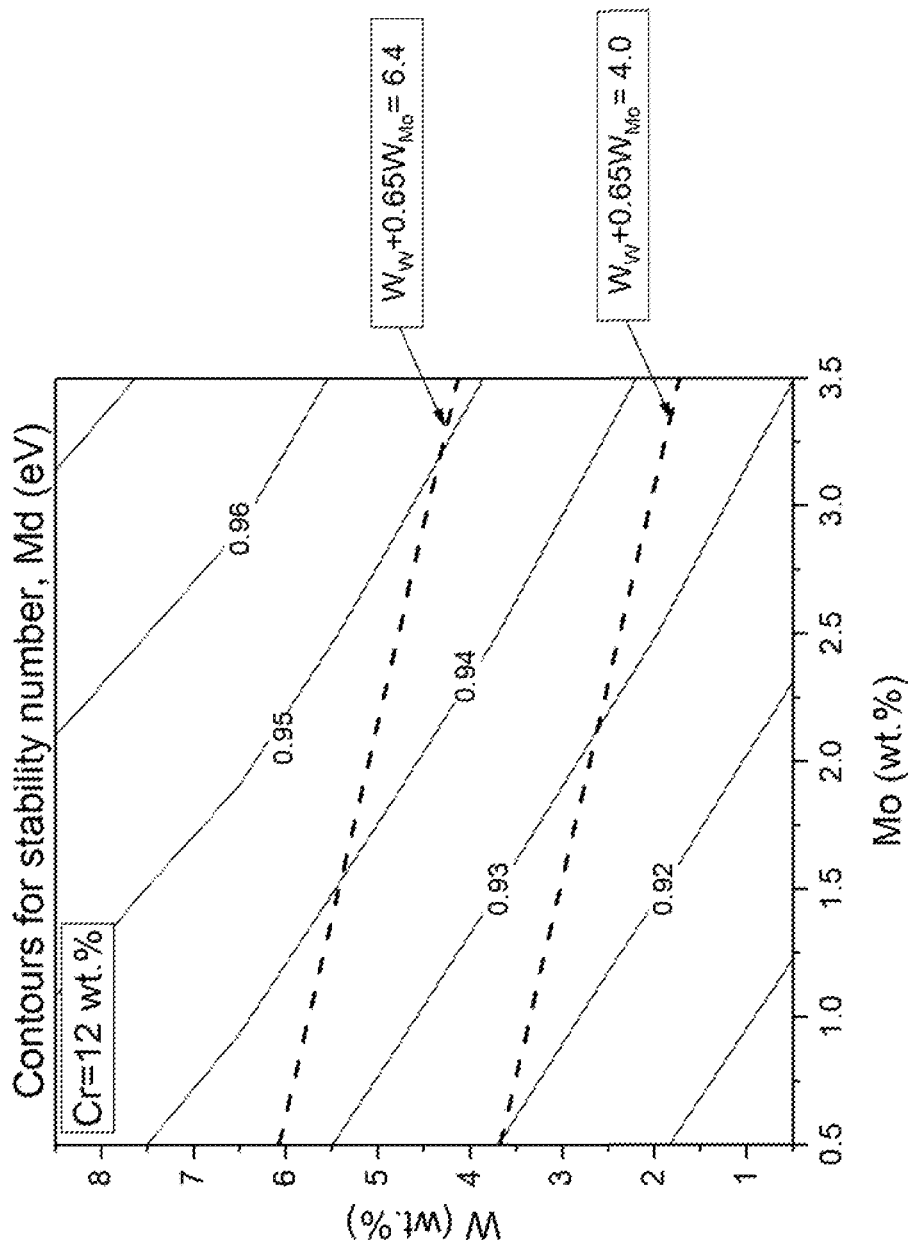
FIG. 9 is a contour plot showing the effect of elements molybdenum and tungsten on alloy stability (in terms of Md number) when the chromium content is fixed at 12.0 wt %, delineated on the graph are different levels for creep merit index.
Figure 10:
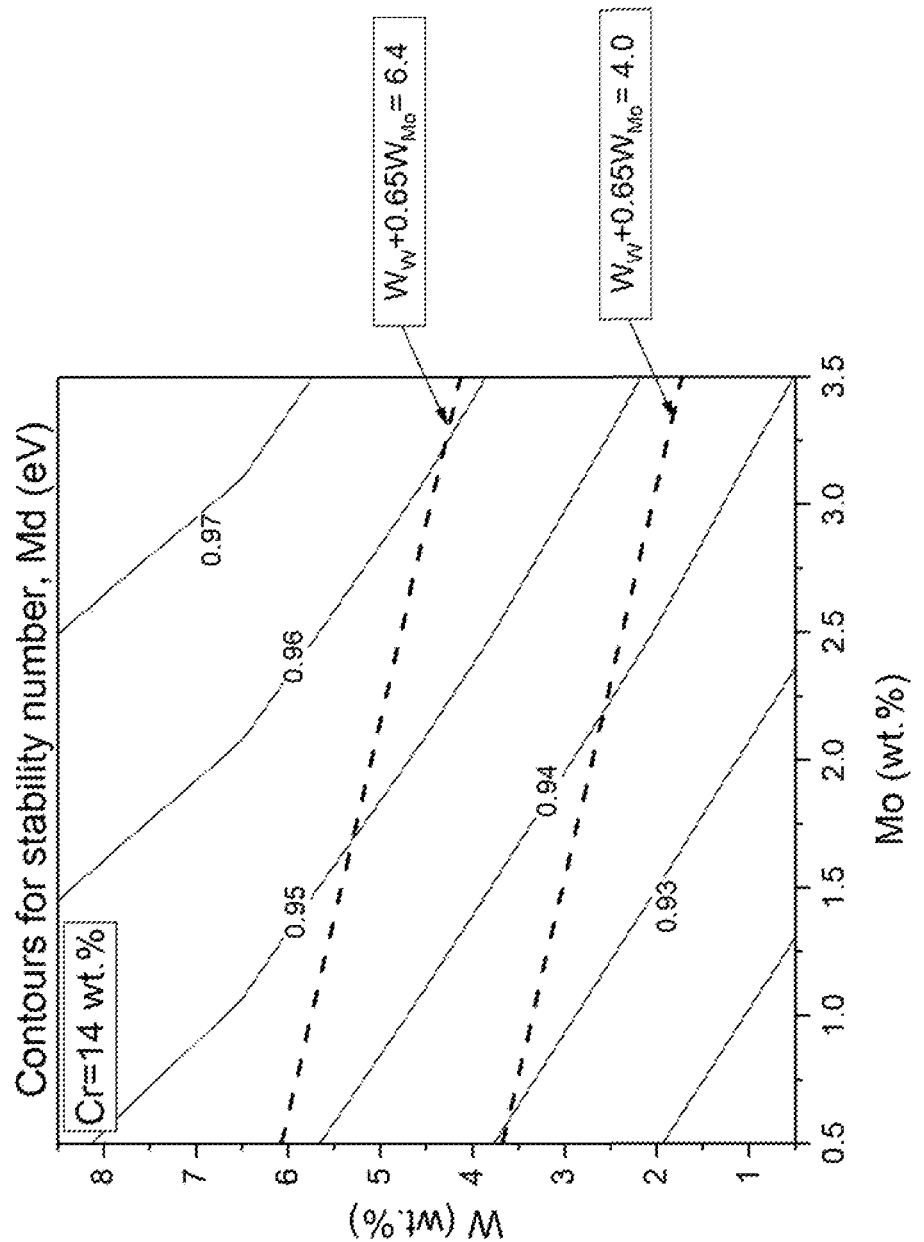
FIG. 10 is a contour plot showing the effect of elements molybdenum and tungsten on alloy stability (in terms of Md number) when the chromium content is fixed at 14.0 wt %, delineated on the graph are different levels for creep merit index.
Figure 11:
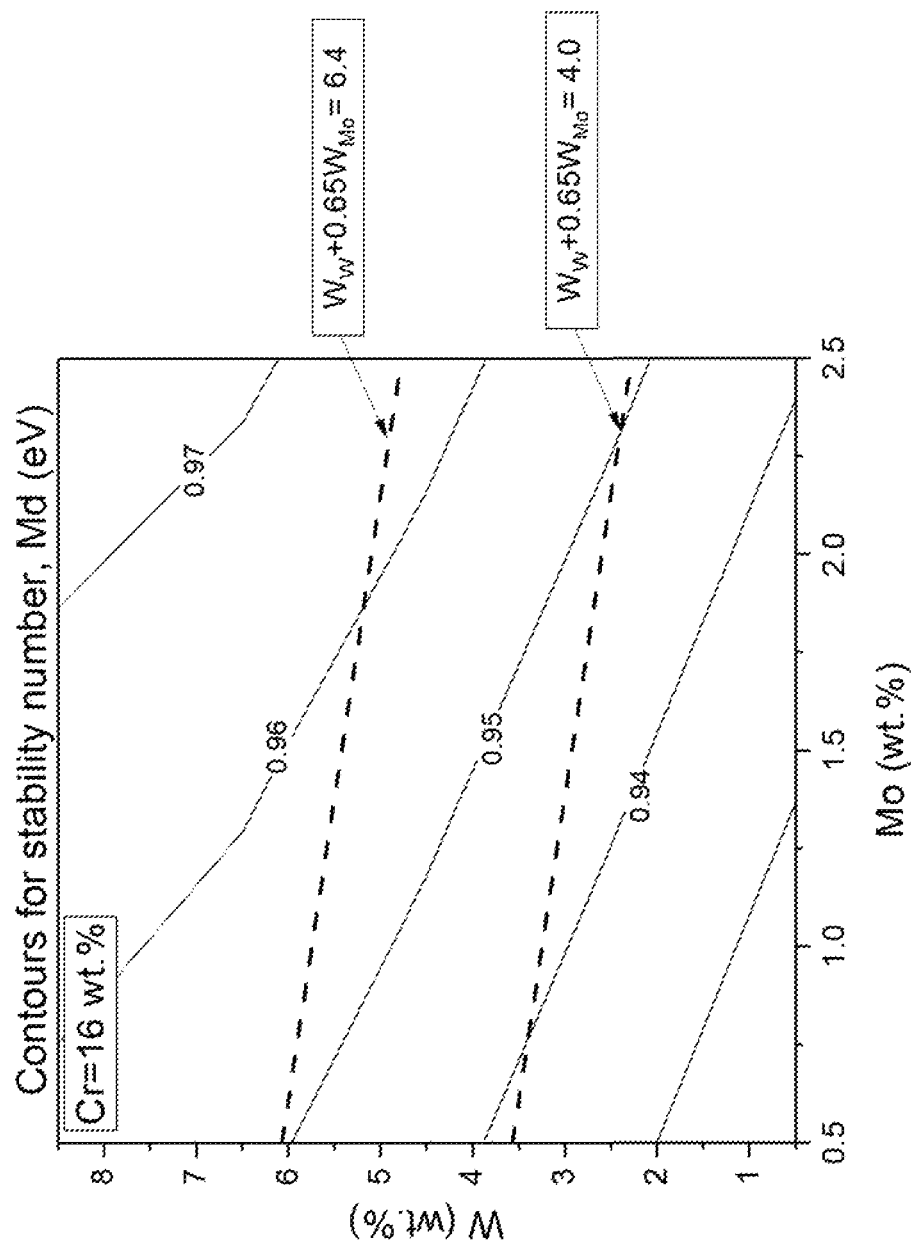
FIG. 11 is a contour plot showing the effect of elements molybdenum and tungsten on alloy stability (in terms of Md number) when the chromium content is fixed at 16.0 wt %, delineated on the graph are different levels for creep merit index.

The desirable minimum requirement for volume fraction of γ' is 0.42, described later in relation to achieving required creep resistance using FIG. 4 and FIG. 5. To achieve the desired volume fraction of γ' the aluminium, titanium niobium and tantalum content must satisfy the following constraint $$f(\gamma')=W_{Al}+0.5W_{Ti}+0.3W_{Nb}+0.15W_{Ta}$$

where, f(γ') is a numerical value which ranges between 5.6 and 7.0 to produce an alloy with the desired γ' fraction of between 0.42 and 0.63. If f(γ') is a numerical value which ranges between 5.6 and 6.5 an alloy with a γ' fraction between 0.42 and 0.56 is produced resulting in an alloy with an improved combination of high creep strength and AM processing. Described later in reference to improving alloy creep resistance it is preferred to have a γ' fraction of 0.43 or greater, more preferably 0.45 or greater and most preferably 0.50 or greater, resulting in preferred values of f(γ') of 5.7 or more, 5.8 or more and 6.1 or more respectively.

The elements platinum, palladium behave in a similar way to that of tantalum, titanium and niobium i.e. they are γ' forming elements which increase anti-phase boundary energy. These elements can optionally be added to the alloy in substitution for the elements tantalum, titanium and niobium. The benefits of this may include an improvement in resistance to high temperature corrosion. The "aluminium equivalent", for platinum and palladium require correctional factors (determined from their density relative to aluminium) of 0.125 and 0.225 respectively. However, additions of these elements can be limited due to the high cost of these elemental additions. Therefore, those elements can each be present in an amount of up to 1.0 wt %, preferably they are limited to 0.5 wt % or less and most preferably 0.1 wt % or less as this range provides the best balance of cost and improvement to corrosion resistance. It is preferred that the following equation is satisfied to provide good processing by additive manufacturing $$W_{Al}+0.5W_{Ti}+0.3W_{Nb}+0.15W_{Ta}+0.125W_{Pt}+0.225W_{Pd} \leq 7.0$$

preferably $$W_{Al}+0.5W_{Ti}+0.3W_{Nb}+0.15W_{Ta}+0.125W_{Pt}+0.225W_{Pd} \leq 6.5$$

where $W_{Pt}$ and $W_{Pd}$ are the weight percent of platinum and palladium in the alloy respectively.

The propensity for an alloy to form hot cracks is determined in terms of a hot cracking index (Equation 11). This hot cracking mechanism is driven by elements which segregate primarily to the liquid phase during solidification, in the design space studied (Table 2) niobium and tantalum are elements which segregate most heavily to liquid phase, therefore they have the strongest influence on hot cracking.

Figure 3:
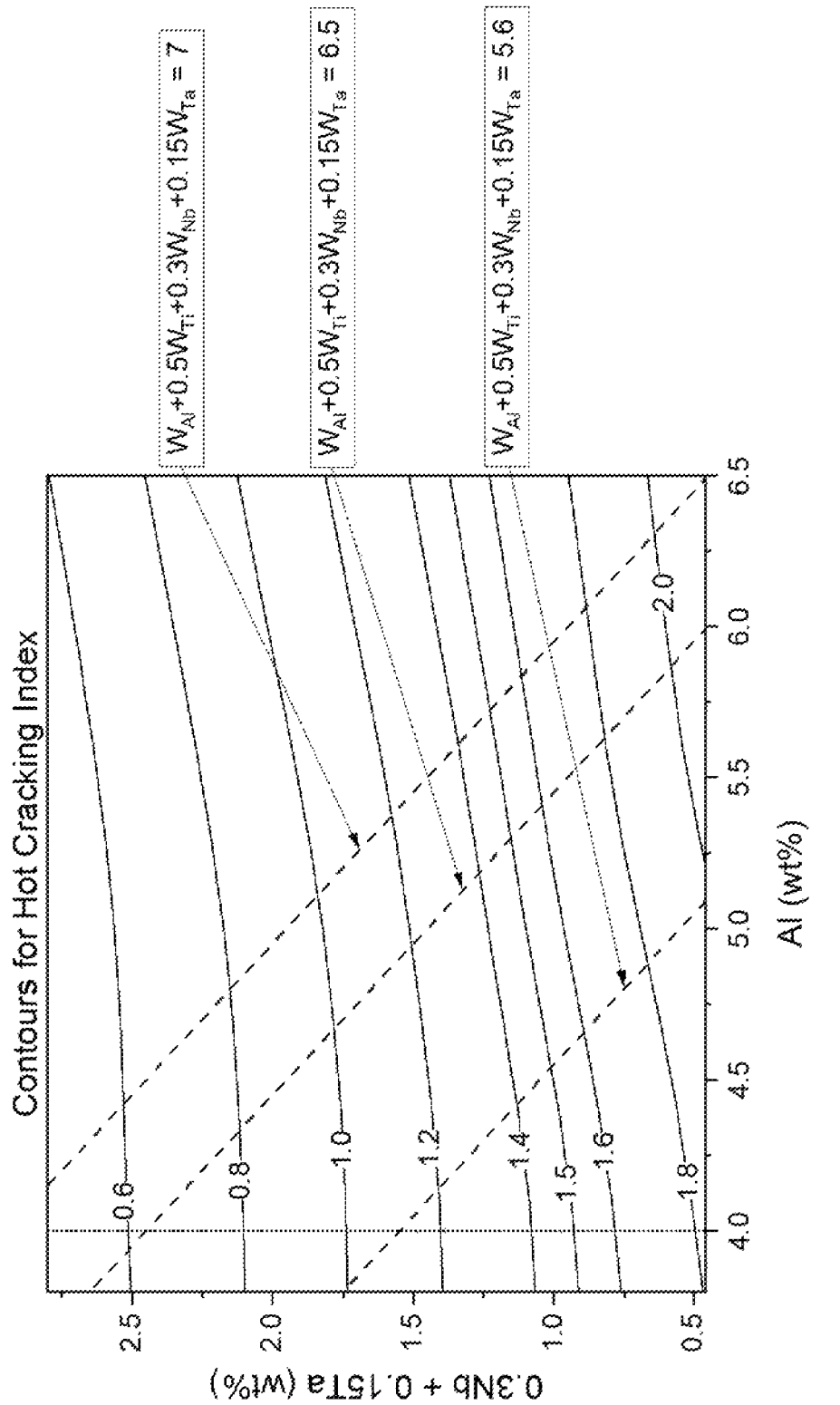
FIG. 3 is a contour plot showing the effect of γ' forming elements aluminium and niobium plus tantalum (according to the relationship $0.3W_{Nb}+0.15W_{Ta}$) on hot cracking index when titanium content is fixed at 0.0 wt % for alloys within the alloy design space, determined from phase equilibrium calculations conducted at 900° C.

FIG. 3 shows the hot cracking index as a function of the of elements aluminium, niobium and tantalum as these drive strain age cracking (as described in relation to FIG. 1 balancing of strain age cracking and hot cracking is necessary for best AM processability). It is seen that niobium and tantalum strongly affect the hot cracking index. The alloys listed in Table 1 show a high propensity for hot cracking failure during AM, alloy IN738 is the least prone to hot cracking with an index of 1.8. Alloys which process very well in AM and do not exhibit hot cracking, such as alloy 718 and alloy 625 have a hot cracking index of less than 1.0 (FIG. 1). For an alloy which is much more resistant to hot cracking an index of less than 1.5 is useful, from FIG. 3 it is determined that to achieve the desired hot cracking index the niobium and tantalum content must satisfy the following constraint $$f(HCl)=0.3W_{Nb}0.15W_{Ta}$$

where f(HCl) is a numerical value, of which a value of 1.1 or greater (or 1.10 or greater) achieves a hot cracking index of 1.5 or less. On FIG. 2 the line for a hot cracking index of 1.5 is superimposed. It is seen that to achieve a hot cracking index of 1.5 or less in combination with a strain age cracking index of 7.0 or less aluminium must be limited to 5.6 wt % or less. More preferably a hot cracking index of 1.5 or less in combination with a strain age index of 6.5 or less is desired so it is preferable to limit to 5.3 wt % aluminium. A maximum level of 5.3 wt % or less aluminium is more preferred because of the reduced strain age cracking risk and all example alloys below fall within this range. It is preferred that niobium is limited to 3.0 wt % or less for improving alloy resistance to oxidation assisted cracking. When niobium is at its preferred level of 3.0 wt % to achieve a hot cracking index of 1.5 or less in combination with a strain age index of 6.5 or less it is preferred that the alloy contains at least 1.1 wt % tantalum to achieve the desired value for hot cracking index.

For better resistance to hot cracking it is more preferable to have a hot cracking index of 1.0 or less, so a numerical value for f(HCl) of greater than 1.8 is preferred, though a value of 1.15 or greater or 1.2 or greater or 1.4 or greater is also desirable. On FIG. 2 the lines for a hot cracking index of 1.0 and 1.5 are superimposed (HCl=1 and HCl=1.5). It is seen that to achieve a hot cracking index of 1.0 or less in combination with a strain age cracking index of 7.0 or less aluminium is limited to 5.1 wt % or less, more preferably a hot cracking index of 1.0 or less in combination with a strain age index of 6.5 or less is desired so it is preferable to limit to 4.6 wt % aluminium.

Based upon the maximum niobium content (4.0 wt %) to achieve the preferred numerical value for f(HCl) of 1.8 or more it is preferred that the tantalum content is at least 3.7 wt %, more preferably niobium is limited to 3.0 wt % or less therefore it is preferred that tantalum content is 5.8 wt % or more.

Additions of cobalt have the effect of lowering the γ' solvus temperature. A lowering of γ' solvus temperature is desirable as it reduces the temperature at which γ' precipitation will occur which is advantageous for reducing the rate at which strain-age hardening occurs, as this relies on γ' precipitation. A lower γ' solvus also improves the ability to perform solution heat-treatment needed to homogenise distribution of elemental species occurring after the AM process and also needed to modify certain microstructural features, for example enlarging grain size and to dissolve coarse γ' precipitates which do not provide a great strengthening benefit; by rapidly cooling from solution heat-treatment temperature a fine dispersion of γ' particles can be achieved which aid improved mechanical properties. Thus a minimum level of cobalt of 8.0 wt % or more is desirable and all example alloys below have at least such a level of cobalt. A more preferred minimum level of cobalt is 9.0 wt % and an even more preferable limit is 10.0 wt % or more.

Figure 13:
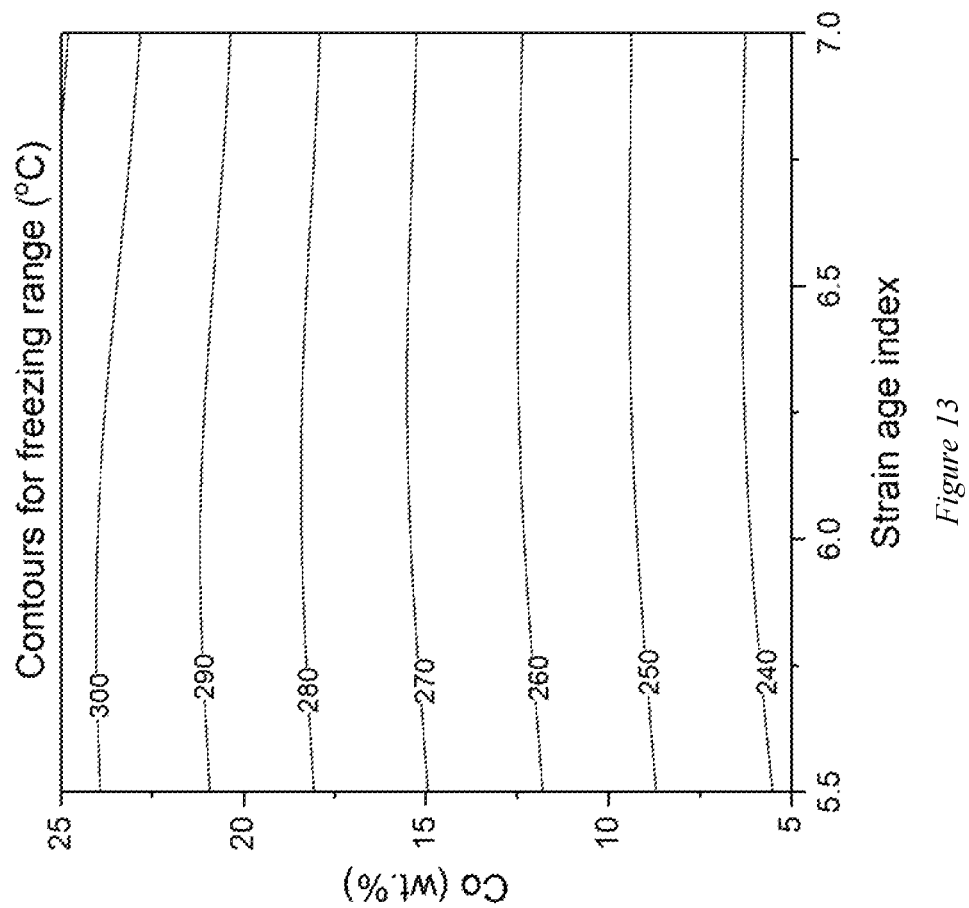
FIG. 13 is a contour plot showing the effect of strain age cracking index and cobalt on alloy solidification range.

However, as cobalt content increases, the Scheil solidification temperature range of the alloy is increased (FIG. 13). A high freezing range is associated with an increased length of time to solidify, and when the alloy is in a semi-solid condition it can be at risk of solidification cracking, so it is desirable to limit the freezing range. A target freezing range of 300° C. or less is desired, therefore cobalt up to 22.0 wt % is allowable. In order to match the freezing range of IN792, it is desirable that the cobalt content is 15.0 wt % or less.

The relationship between γ' volume fraction and creep merit index on creep resistance (in terms of temperature capability at 137 MPa, with contours normalised to IN713) is shown in FIG. 4, increasing both parameters will increase creep resistance and the sensitivity to each parameter is determined. The position of the alloys listed in Table 3 are shown in FIG. 4. The aim of the invention is to have a creep performance which is equivalent to IN713C, more preferably an improvement of 25° C. is desired.

For the alloy of this invention it is desired that the creep merit index higher than alloy IN713C. Therefore, for the alloy of this invention a creep merit index of $6.0 \times 10^{-15}$ m$^{-2}$s is desired. The elemental additions required to achieve this level of creep merit index are reviewed in following section with reference to FIG. 5. The maximum achievable creep merit index is determined from the need to have a minimum of 6.0 wt % chromium in the alloy for corrosion resistance while maintaining a stable microstructure which is essentially free from TCP phases (see FIG. 5). A γ' volume fraction of 0.42 is desired to have a creep resistance equivalent to IN713C. More preferably a minimum of 25° C. improvement of creep resistance of IN713C is desired, therefore particularly when the creep merit index is $6.0 \times 10^{-15}$ m$^{-2}$s it is preferable to have a γ' volume fraction of 0.50, this is equivalent to numerical value of f(γ') greater than or equal to 6.1.

Slow diffusing elements which partition to the gamma matrix phase most strongly influence the creep merit index, which is calculated based upon the composition of the gamma-phase at an equilibrium temperature of 900° C. Tungsten is the slowest diffusing element in the alloy design space listed in Table 2, followed by molybdenum. The influence of the elements tungsten and molybdenum on creep resistance is presented in FIG. 5. From FIG. 5 it is determined that the change in creep merit index was related to the sum of the elements molybdenum and tungsten according to the formula $$f(CMI)=W_W+0.65W_{Mo}$$

where f(CMI) is a numerical value and $W_W$ and $W_{Mo}$ are the weight percent of tungsten and molybdenum in the alloy respectively. A value of 4.0 or greater is desired as this achieves the desired creep merit index of $6.0 \times 10^{-15}$ m$^{-2}$s. Based upon the maximum limit of molybdenum (3.0 wt %) a minimum tungsten content of 2.0 wt % is required. More preferably molybdenum is limited to 2 wt % therefore it is preferred to have a tungsten content of 2.7 wt % or greater. Most preferably molybdenum is limited to 1.8 wt % therefore it is most preferable to have a minimum of 2.8 wt % or greater. A more desirable level of f(CMI) is 6.0 or greater, preferably 8.0 or greater.

For an even better combination of creep resistance and resistance to strain age cracking it is desired to have a 25° C. improvement in temperature capability over IN713C combined with a strain age cracking index of 6.5 or less. This limits the maximum γ' volume fraction to 0.56, therefore a creep merit index of $6.90 \times 10^{-15}$ m$^{-2}$s or greater is required. To achieve a creep merit index of $6.9 \times 10^{-15}$ m$^{-2}$s or greater the value for f(CMI) must be 6.4 or greater. Based upon the maximum limit of molybdenum (3 wt %) a minimum tungsten content of 4.7 wt % is required. More preferably molybdenum is limited to 2.0 wt % therefore it is preferred to have a tungsten content of 5.1 wt % or greater. Most preferably molybdenum is limited to 1.8 wt % therefore it is most preferable to have a minimum of 5.2 wt % or greater.

The elements rhenium, ruthenium and iridium behave in a similar way to that of tungsten i.e. they are gamma forming elements which improve the creep merit index. These elements can optionally be added to the alloy. Additions of these elements will significantly increase the creep response of the alloy in comparison to tungsten (as they have much slower diffusivity), however this is achieved with substantial increases in cost due to the high cost of the elements. Preferably the addition of rhenium and iridium is limited to less than 3.0 wt % and even more preferably less than 2.0 wt %, most preferably less than 1.5 wt % due to its elemental cost. Ruthenium deleteriously increases hot cracking index (see AM1055 and AM1056) and so it is limited 2.0 wt %, preferably 1.5 wt %.

There is a trade-off between creep resistance (in terms of creep merit index), alloy stability (in terms of Md number) and alloy corrosion resistance (in terms of chromium content). The limit for alloy stability at different levels of chromium content as determined by the equation for f(stability) (described below with reference to FIGS. 6-10) are delineated on FIG. 5. It is seen that as chromium is increased for a given microstructural stability the creep merit index reduces. Thus lower levels of chromium are seen to be beneficial for microstructural stability but undesirable for high creep merit index.

Improvements in oxidation and in particular corrosion resistance come from additions of chromium. However, the additions of molybdenum and tungsten for creep resistance as well as chromium for oxidation and corrosion resistance will increase the propensity for the alloy to form unwanted TCP phases. FIGS. 6-10 show the effect of tungsten and molybdenum additions on phase stability for alloys containing different levels of chromium. A higher stability number results in an alloy which is more prone to TCP phase formation. Limiting or stopping the precipitation of TCP phase formation is beneficial as these phases lead to deterioration in material properties over time. A complex trade-off between mechanical performance, oxidation/corrosion resistance and microstructural stability must be managed.

A stability number target (Md) of 0.93 or less (determined at an equilibrium temperature of 900° C.) is desired in order to ensure microstructural stability and avoid TCP formation, see prior art alloys in Table 3. More preferably a stability number target of 0.92 or less is desirable in order to ensure better microstructural stability and avoid TCP formation. From FIGS. 6-10 it is determined that for alloys with a volume fraction of γ' between 42-63% the additions of the elements molybdenum tungsten and chromium adhere to the following equation $$f(\text{stability}) = W_W + W_{Cr} + 1.7 W_{Mo}$$

where f(stability) is a numerical value. If f(stability) has a value or 18.7 or less an alloy with a stability number of 0.93 or less is achieved. Based on the equation for f(stability), assuming the minimum amount of tungsten of 2.0 wt %, chromium may be present in an amount of 16.7 wt % or less in order to satisfy the desirable microstructural stability Md of 0.93 or less. Based on the equation for f(stability) when chromium levels are 6.0 wt % a maximum limit of 12.7 wt % tungsten can be included in the alloy. A preferred chromium content of 8.0 wt % and even more preferably 10 wt % results in tungsten being limited to 10.7 wt % or less and 8.7 wt % or less respectively.

The best balance of creep resistance and corrosion resistance (while maintaining alloy stability) is achieved when tungsten is equal to 4.0 wt % (based upon f(CMI)). Limiting the maximum chromium content of the alloy to 14.7 wt % or less is therefore preferred as this allows 4.0 wt % tungsten and a stability number Md or 0.93 or less. It is preferable to limit the stability number to 0.92. To do this the numerical value for f(stability) should be less 17.8. It is therefore preferable to limit chromium content to 13.8 wt % as this will limit the stability number to 0.92 providing better microstructural stability.

Figure 12:
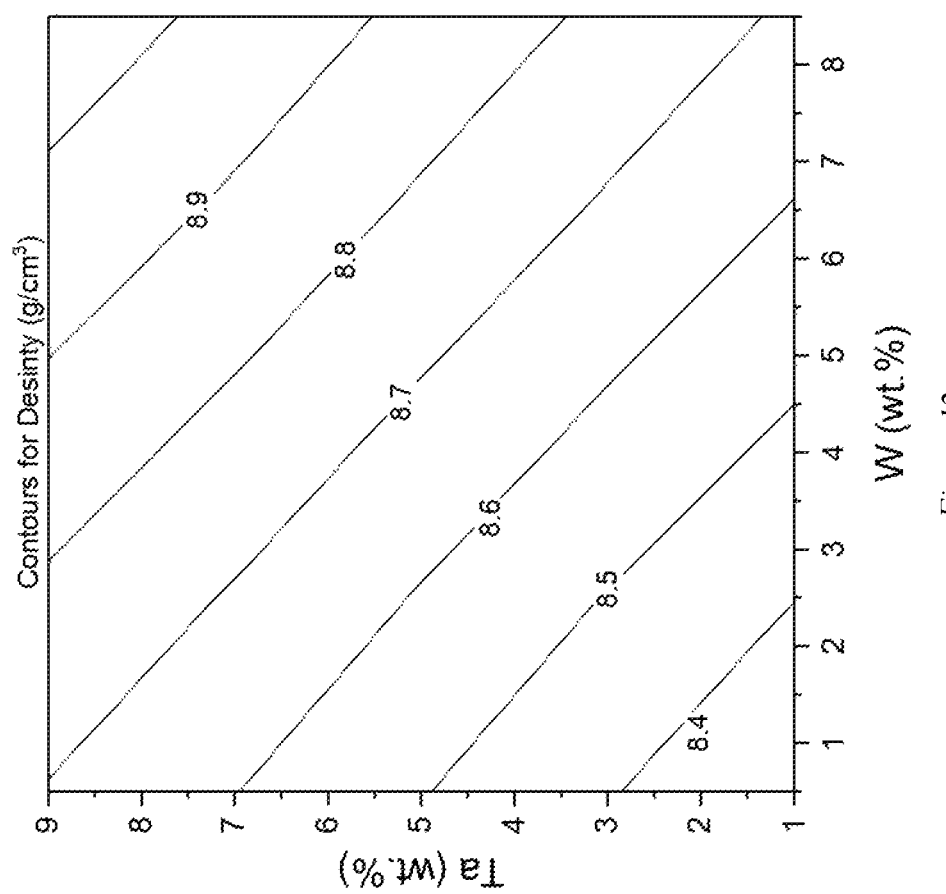
FIG. 12 is a contour plot showing the effect of elements tantalum and tungsten on alloy density.

In combination with a high level of mechanical strength—in terms of creep resistance—there is a requirement to limit the density of the alloy. A density target of 8.9 g/cm³ is imposed, this is typical of the upper limit of density for commercially used nickel-based superalloys. From the elements within the alloy design space listed in Table 2 the elements tungsten and tantalum have a density which is significantly greater than nickel and have strongest influence on increasing density. FIG. 12 shows the effect of elements tantalum and tungsten on alloy density. From FIG. 12 it is determined that additions of tungsten and tantalum should adhere to the following equation $$f(\text{density}) = W_W + W_{Ta}$$

where f(density) is a numerical value which must be less than 13.9 in order to achieve an alloy with a density of less than 8.9 g/cm³. Given that the minimal required concentration of tungsten (2.0 wt %) it is necessary to limit the tantalum concentration to less than 11.9 wt %. Preferably density is limited to less than 8.8 g/cm³, to achieve this the numerical value for f(density) should be less than 11.8 therefore tantalum should be 9.8 wt % or less. Even more preferably tungsten should be greater than 4.7 wt % or greater, therefore tantalum should be limited to 9.2 wt % and 7.1 wt % to achieve a value of f(density) of 13.9 and 11.8 respectively. A lower level of tantalum (say 7.1 wt % or less, which is the most desired maximum level for tantalum and which all example alloys below fall within) also allows an optional increased level of tungsten whilst keeping the density of the alloy down.

Additions of carbon, boron and zirconium provide strength to grain boundaries. This is particularly beneficial for the creep and fatigue properties of the alloy. The carbon concentrations should range from 0.02 wt % to 0.35 wt %. Preferably lower levels of carbon are preferred in order to reduce cracking during the additive manufacturing process, thus a content of less than 0.2 wt % or less than 0.15 wt % is preferred, more preferably less than 0.1 wt %. The boron concentration should range from 0.001 to 0.2 wt %, preferably less than 0.03 wt % as boron separates to the liquid phase during solidification and may lead to liquation cracking during the AM process, more preferably less than 0.02 wt %. The zirconium concentrations should range up to 0.5 wt %, preferably from 0.001 wt % to 0.5 wt %, preferably less than 0.05 wt % or less than 0.035 wt %, more preferably less than 0.01 wt %, more preferably less than 0.006 wt %. Preferably the zirconium concentration is 0.005 wt % or more, more preferably 0.010 wt % or more.

It is beneficial that when the alloy is produced, it is substantially free from incidental impurities. These impurities may include the elements sulphur (S), manganese (Mn) and copper (Cu). The element sulphur should remain 0.003 wt % or less (30 PPM in terms of mass). The presence of sulphur above 0.003 wt %, can lead to embrittlement of the alloy and sulphur also segregates to alloy/oxide interfaces formed during oxidation, preferably sulphur levels are 0.001 wt % or less. Manganese is an incidental impurity which is limited to 0.25 wt %, preferably this limited to 0.1 wt % or less. Copper is an incidental impurity which is preferably limited to 0.5 wt %. Vanadium (V) is an incidental impurity, which negatively influences the oxidation behaviour of the alloy and is which is preferably limited to 0.5 wt %, preferably 0.3 wt % or less and most preferably this limited to 0.1 wt % or less. This segregation may lead to increased spallation of protective oxide scales. If the concentrations of these incidental impurities exceed the specified levels, issues surrounding product yield and deterioration of the material properties of the alloy is expected.

Iron behaves in a similar way to nickel and can be added as a low-cost alternative to nickel. Moreover, tolerance to iron additions improves the ability of the alloy to be manufactured from recycled materials. Therefore, it is preferred that iron is present in an amount of at least 0.1 wt %. However, additions of iron up to 4.0 wt % can be made in order to substantially reduce the cost. Preferably the additions of iron are 2.0 wt % or less in order to reduce the propensity to form the unwanted Laves phase which degrades the mechanical properties of the alloy. Most preferably iron additions are limited to 1.0 wt % as this produces an alloy which has good ability to be recycled with no loss in material performance.

Additions of hafnium (Hf) of up to 1.0 wt %, preferably up to 0.5 wt %, or more preferably up to 0.4 wt %, more even more preferably 0.2 wt % are beneficial for tying up incidental impurities in the alloy and for providing strength. Hafnium is a strong carbide former, and so can provide additional grain boundary strengthening. In addition, hafnium is beneficial for improving the adhesion of protective $Al_2O_3$ oxide layers. Therefore a minimum amount of hafnium of 0.1 wt % or more is desirable, and a minimum amount of hafnium of 0.15 wt % even more desirable from the point of view of increased strength at the expense of increased cost.

Additions of the so called 'reactive-elements', yttrium (Y), lanthanum (La) and cerium (Ce) may be beneficial up to levels of 0.1 wt % to improve the adhesion of protective oxide layers, such as $Al_2O_3$. These reactive elements can 'mop up' tramp elements, for example sulphur, which segregates to the alloy oxide interface weakening the bond between oxide and substrate leading to oxide spallation. Magnesium (Mg) likewise may act to 'mop up' tramp elements, and can have beneficial effects on mechanical properties, so may be added up to 0.1%. Additions of silicon (Si) up to 0.5 wt % may be beneficial, it has been shown that additions of silicon to nickel based superalloys at levels up to 0.5 wt % are beneficial for oxidation properties. In particular silicon segregates to the alloy/oxide interface and improves cohesion of the oxide to the substrate. This reduces spallation of the oxide, hence, improving oxidation resistance.

Based upon the description of the invention presented in this section the broad range for the invention is listed in Table 4. A preferable range is also given in Table 4 as well as a most preferable range.

TABLE 4

Compositional range in wt % for the newly designed alloy.

| Alloy (wt %) | Al | Co | Cr | Mo | Nb | Ta | Ti | W |
|---|---|---|---|---|---|---|---|---|
| Min | 4.0 | 0.0 | 6.0 | 0.0 | 0.0 | 0.0 | 0.0 | 2.0 |
| Max | 5.6 | 22.0 | 16.7 | 3.0 | 4.0 | 11.9 | 1.0 | 12.7 |
| Preferable Min | 4.0 | 8.0 | 8.0 | 0.0 | 0.0 | 3.7 | 0.1 | 4.7 |
| Preferable Max | 5.3 | 15.0 | 14.7 | 2.0 | 3.0 | 9.8 | 0.5 | 10.7 |
| Most Preferable Min | 4.5 | 10.0 | 10.0 | 0.5 | 0.0 | 5.8 | 0.0 | 5.2 |
| Most Preferable Max | 4.6 | 15.0 | 13.8 | 1.8 | 3.0 | 7.1 | 0.5 | 8.7 |

Examples of the Invention

TABLE 5

Nominal compositions in wt % of the newly designed high volume fraction of γ' nickel-based superalloys compared with the alloys listed in Table 1.

| Alloy (wt %) | Al | Co | Cr | Mo | Nb | Ta | Ti | W | C | B | Zr | f(HCI) | f(CMI) |
|---|---|---|---|---|---|---|---|---|---|---|---|---|---|
| IN738 | 3.4 | 8.5 | 16.0 | 1.8 | 0.9 | 1.8 | 3.4 | 2.6 | 0.11 | 0.01 | 0.04 | 0.53 | 3.7 |
| CM247 | 5.5 | 9.5 | 8.4 | 0.5 | 0.0 | 3.0 | 0.7 | 9.5 | 0.07 | 0.015 | 0.015 | 0.45 | 9.8 |
| IN713 | 6.0 | 0.0 | 12.5 | 4.5 | 2.0 | 0.0 | 0.8 | 0.0 | 0.12 | 0.001 | 0.10 | 0.60 | 2.9 |
| IN792 | 3.2 | 9.0 | 12.7 | 1.8 | 0.0 | 3.9 | 4.2 | 3.9 | 0.07 | 0.016 | 0.018 | 0.59 | 5.1 |
| AM1005 | 4.2 | 19.0 | 9.0 | 1.2 | 3.6 | 5.8 | 0.1 | 7.0 | 0.04 | 0.005 | — | 1.95 | 7.8 |
| AM1006 | 4.7 | 19.0 | 9.0 | 1.2 | 2.9 | 4.6 | 0.1 | 7.0 | 0.04 | 0.005 | — | 1.56 | 7.8 |
| AM1007 | 5.2 | 19.0 | 9.0 | 1.2 | 2.2 | 3.3 | 0.1 | 7.0 | 0.04 | 0.005 | — | 1.16 | 7.8 |
| AM1010 | 4.0 | 19.0 | 9.0 | 1.2 | 3 | 4.6 | 0.1 | 7.0 | 0.04 | 0.005 | — | 1.59 | 7.8 |
| AM1011 | 4.5 | 19.0 | 9.0 | 1.2 | 2.3 | 3.4 | 0.1 | 7.0 | 0.04 | 0.005 | — | 1.2 | 7.8 |
| AM1013 | 5.0 | 19.0 | 9.0 | 1.0 | 3.4 | 5.8 | 0.1 | 6.5 | 0.04 | 0.005 | — | 1.92 | 7.15 |

TABLE 6

Calculated phase fractions and merit indices made with the "Alloys-by-Design" software. Results for conventional high volume fraction of γ' nickel-based superalloys used listed in Table 1 and newly designed high volume fraction of γ' nickel-based superalloys compared with the alloys listed in Table 1.

| Alloy | γ' | Creep Merit Index ($m^{-2}s \times 10^{-15}$) | Density (g/cm$^3$) | Strength Merit Index (MPa) | Md (eV) | Strain Age Index | Hot Cracking Index | Freezing Range (° C.) | Cost $/kg |
|---|---|---|---|---|---|---|---|---|---|
| IN738 | 0.45 | 5.9 | 8.3 | 1517 | 0.92 | 5.6 | 1.82 | 259 | 5.5 |
| CM247LC | 0.59 | 8.0 | 8.6 | 1243 | 0.92 | 6.3 | 4.44 | 606 | 10.6 |
| IN713 | 0.55 | 5.8 | 8.0 | 1139 | 0.93 | 7.0 | 2.03 | 213 | 2.5 |
| IN792 | 0.51 | 6.4 | 8.5 | 1702 | 0.92 | 5.9 | 2.05 | 269 | 7.4 |
| AM1005 | 0.51 | 7.4 | 8.9 | 1675 | 0.92 | 6.2 | 0.72 | 277 | 12.3 |
| AM1006 | 0.51 | 7.4 | 8.7 | 1522 | 0.92 | 6.3 | 1.04 | 292 | 10.8 |
| AM1007 | 0.50 | 7.4 | 8.6 | 1353 | 0.92 | 6.4 | 1.48 | 304 | 9.3 |

TABLE 6-continued

Calculated phase fractions and merit indices made with the "Alloys-by-Design" software. Results for conventional high volume fraction of γ' nickel-based superalloys used listed in Table 1 and newly designed high volume fraction of γ' nickel-based superalloys compared with the alloys listed in Table 1.

| Alloy | γ' | Creep Merit Index ($m^{-2}s \times 10^{-15}$) | Density (g/cm³) | Strength Merit Index (MPa) | Md (eV) | Strain Age Index | Hot Cracking Index | Freezing Range (° C.) | Cost $/kg |
|---|---|---|---|---|---|---|---|---|---|
| AM1010 | 0.42 | 7.4 | 8.9 | 1471 | 0.91 | 5.6 | 1.01 | 280 | 10.8 |
| AM1011 | 0.42 | 7.4 | 8.7 | 1317 | 0.91 | 5.8 | 1.43 | 291 | 9.4 |
| AM1013 | 0.59 | 7.2 | 8.7 | 1694 | 0.93 | 7.0 | 0.77 | 292 | 12.1 |

The example alloys in tables 5 and 6 have been designed by varying the quantity f(HCI). The γ' content has been controlled by varying the quantity f(SAC). Creep merit index is controlled by the presence of Mo and W. The result is that all eight alloys have superior hot cracking indices than the prior art alloys, along with comparable or greater strength and creep predictions. The alloys AM1005-7 are designed to have the same strain-age cracking index as CM247LC. AM1005 is designed to have the lowest hot cracking risk but is also likely to have the poorest oxidation resistance due to its comparatively low Al content. By contrast, AM1007 is designed to have the best oxidation resistance but the least hot cracking resistance. AM1006 represents a middle ground between the two. The alloys AM1010 and AM1011 are homologous to AM1005-7 but at the lower end of the allowable range of f(SAC), while AM1013 sits at the upper end of the allowable range of f(SAC).

TABLE 7

Nominal compositions in wt % of the newly designed high volume fraction of γ' nickel-based superalloys.

| Alloy (wt %) | Al | Co | Cr | Mo | Nb | Ta | Ti | W | C | B | Zr | f (HCI) | f (CMI) |
|---|---|---|---|---|---|---|---|---|---|---|---|---|---|
| AM1018 | 4.7 | 19.0 | 9.0 | 1.2 | 1.7 | 7.0 | 0.1 | 7.0 | 0.04 | 0.005 | — | 1.56 | 7.8 |
| AM1019 | 4.7 | 19.0 | 9.0 | 1.2 | 2.2 | 6.0 | 0.1 | 7.0 | 0.04 | 0.005 | — | 1.56 | 7.8 |
| AM1020 | 4.7 | 19.0 | 9.0 | 1.2 | 2.7 | 5.0 | 0.1 | 7.0 | 0.04 | 0.005 | — | 1.56 | 7.8 |
| AM1021 | 4.7 | 19.0 | 9.0 | 1.2 | 3.2 | 4.0 | 0.1 | 7.0 | 0.04 | 0.005 | — | 1.56 | 7.8 |
| AM1022 | 4.7 | 19.0 | 9.0 | 1.2 | 3.7 | 3.0 | 0.1 | 7.0 | 0.04 | 0.005 | — | 1.56 | 7.8 |

TABLE 8

Calculated phase fractions and merit indices made with the "Alloys-by-Design" software of the alloys listed in table 7.

| Alloy | γ' | Creep Merit Index ($m^{-2}s \times 10^{-15}$) | Density (g/cm³) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1018 | 0.52 | 7.4 | 8.8 | 1582 | 0.92 | 6.3 | 0.89 | 300 | 12.8 |
| AM1019 | 0.51 | 7.4 | 8.8 | 1557 | 0.92 | 6.3 | 0.96 | 298 | 11.9 |
| AM1020 | 0.51 | 7.4 | 8.7 | 1531 | 0.92 | 6.3 | 1.02 | 294 | 11.1 |
| AM1021 | 0.51 | 7.4 | 8.7 | 1505 | 0.92 | 6.3 | 1.06 | 288 | 10.3 |
| AM1022 | 0.50 | 7.4 | 8.7 | 1479 | 0.92 | 6.3 | 1.10 | 281 | 9.53 |

Tables 7 and 8 show the properties of alloys AM1018 to AM1022, which are variants of alloy AM1006. In these alloys the proportions of Ta and Nb have been varied so as to keep the values of f(HCl) and f(SAC) constant. It is shown that the Ta-rich alloys have a higher strength and creep merit indices and more favourable hot cracking index. However, the Nb-rich alloys have lower density and cost, along with narrower Scheil freezing range.

TABLE 9

Nominal compositions in wt % of the newly designed high volume fraction of γ' nickel-based superalloys.

| Alloy (wt %) | Al | Co | Cr | Mo | Nb | Ta | Ti | W | C | B | Zr | f (HCI) | f (CMI) |
|---|---|---|---|---|---|---|---|---|---|---|---|---|---|
| AM1023 | 4.2 | 19.0 | 9.0 | 1.2 | 3.6 | 5.8 | 0.1 | 7.0 | 0.04 | 0.005 | — | 1.95 | 7.8 |
| AM1024 | 4.2 | 17.0 | 9.0 | 1.2 | 3.6 | 5.8 | 0.1 | 7.0 | 0.04 | 0.005 | — | 1.95 | 7.8 |
| AM1025 | 4.2 | 15.0 | 9.0 | 1.2 | 3.6 | 5.8 | 0.1 | 7.0 | 0.04 | 0.005 | — | 1.95 | 7.8 |
| AM1026 | 4.2 | 13.0 | 9.0 | 1.2 | 3.6 | 5.8 | 0.1 | 7.0 | 0.04 | 0.005 | — | 1.95 | 7.8 |
| AM1027 | 4.2 | 11.0 | 9.0 | 1.2 | 3.6 | 5.8 | 0.1 | 7.0 | 0.04 | 0.005 | — | 1.95 | 7.8 |
| AM1028 | 4.2 | 9.0 | 9.0 | 1.2 | 3.6 | 5.8 | 0.1 | 7.0 | 0.04 | 0.005 | — | 1.95 | 7.8 |

TABLE 10

Calculated phase fractions and merit indices made with the "Alloys-by-Design" software of the alloys listed in table 9.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1023 | 0.51 | 7.4 | 8.9 | 1675 | 0.92 | 6.2 | 0.72 | 277 | 12.3 |
| AM1024 | 0.51 | 7.4 | 8.9 | 1671 | 0.92 | 6.2 | 0.79 | 272 | 11.9 |
| AM1025 | 0.51 | 7.4 | 8.9 | 1665 | 0.92 | 6.2 | 0.86 | 266 | 11.6 |
| AM1026 | 0.51 | 7.4 | 8.9 | 1657 | 0.92 | 6.2 | 0.94 | 262 | 11.3 |
| AM1027 | 0.51 | 7.4 | 8.9 | 1646 | 0.92 | 6.2 | 1.02 | 258 | 11.0 |
| AM1028 | 0.51 | 7.4 | 8.9 | 1631 | 0.92 | 6.2 | 1.11 | 254 | 10.6 |

Tables 9 and 10 show the composition and properties of alloys AM1023 to AM1028. These alloys are variants of AM1005 with cobalt substituted out for nickel. The lower-cobalt alloys may be desirable for cost-limited applications and have narrower freezing ranges. On the other hand, lower-cobalt alloys display lower strength merit indices and higher hot cracking indices, hence making them less desirable for applications limited by strength and/or printability. Higher Co content also acts to marginally supress the formation of γ', which is also beneficial for printability. Lower levels of cobalt are also possible, at the expense of strength.

TABLE 11

Nominal compositions in wt % of the newly designed high volume fraction of γ' nickel-based superalloys.

| Alloy (wt %) | Al | Co | Cr | Mo | Nb | Ta | Ti | W | C | B | Zr | f (HCI) | f (CMI) |
|---|---|---|---|---|---|---|---|---|---|---|---|---|---|
| AM1033 | 4.7 | 18.0 | 9.0 | 1.2 | 2.9 | 4.6 | 0.1 | 7.0 | 0.04 | 0.005 | 1.0 | 1.56 | 7.8 |
| AM1034 | 4.7 | 16.0 | 9.0 | 1.2 | 2.9 | 4.6 | 0.1 | 7.0 | 0.04 | 0.005 | 3.0 | 1.56 | 7.8 |
| AM1036 | 4.7 | 19.0 | 9.0 | 1.2 | 2.9 | 4.6 | 0.1 | 7.0 | 0.04 | 0.005 | 1.0 | 1.56 | 7.8 |
| AM1037 | 4.7 | 19.0 | 9.0 | 1.2 | 2.9 | 4.6 | 0.1 | 7.0 | 0.04 | 0.005 | 3.0 | 1.56 | 7.8 |
| AM1039 | 4.7 | 10.0 | 9.0 | 1.2 | 2.9 | 4.6 | 0.1 | 7.0 | 0.04 | 0.005 | 1.0 | 1.56 | 7.8 |
| AM1040 | 4.7 | 8.0 | 9.0 | 1.2 | 2.9 | 4.6 | 0.1 | 7.0 | 0.04 | 0.005 | 3.0 | 1.56 | 7.8 |

TABLE 12

Calculated phase fractions and merit indices made with the "Alloys-by-Design" software of the alloys listed in table 11.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1033 | 0.51 | 7.4 | 8.7 | 1521 | 0.92 | 6.3 | 1.02 | 295 | 10.7 |
| AM1034 | 0.50 | 7.4 | 8.7 | 1518 | 0.92 | 6.3 | 0.99 | 299 | 10.3 |
| AM1036 | 0.51 | 7.4 | 8.7 | 1521 | 0.92 | 6.3 | 0.99 | 299 | 10.8 |
| AM1037 | 0.50 | 7.4 | 8.7 | 1518 | 0.93 | 6.3 | 0.94 | 315 | 10.8 |
| AM1039 | 0.52 | 7.4 | 8.7 | 1508 | 0.92 | 6.3 | 1.31 | 269 | 9.33 |
| AM1040 | 0.51 | 7.4 | 8.7 | 1505 | 0.92 | 6.3 | 1.26 | 272 | 9.01 |

Tables 11 and 12 describe alloys AM1033 to AM1041, which contain iron (1-3 wt %, substituted out for cobalt and nickel in various combinations). Iron is mostly benign with regards to mechanical properties, the key reason for its addition being is to reduce cost; this is particularly observed in cases where it is substituted for cobalt.

TABLE 13

Nominal compositions in wt % of the newly designed high volume fraction of γ' nickel-based superalloys.

| Alloy (wt %) | Al | Co | Cr | Mo | Nb | Ta | Ti | W | C | B | Zr | f (HCI) | f (CMI) |
|---|---|---|---|---|---|---|---|---|---|---|---|---|---|
| AM1049 | 4.7 | 19.0 | 6 | 1.6 | 2.9 | 4.6 | 0.1 | 9.32 | 0.04 | 0.005 | — | 1.56 | 10.36 |
| AM1050 | 4.7 | 19.0 | 8.0 | 1.33 | 2.9 | 4.6 | 0.1 | 7.77 | 0.04 | 0.005 | — | 1.56 | 8.64 |
| AM1051 | 4.7 | 19.0 | 10.0 | 1.07 | 2.9 | 4.6 | 0.1 | 6.23 | 0.04 | 0.005 | — | 1.56 | 6.92 |
| AM1052 | 4.7 | 19.0 | 12.0 | 0.8 | 2.9 | 4.6 | 0.1 | 4.68 | 0.04 | 0.005 | — | 1.56 | 5.20 |
| AM1053 | 4.7 | 19.0 | 14.0 | 0.54 | 2.9 | 4.6 | 0.1 | 3.13 | 0.04 | 0.005 | — | 1.56 | 3.45 |

TABLE 14

Calculated phase fractions and merit indices made with the "Alloys-by-Design" software of the alloys listed in table 13.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1049 | 0.53 | 8.0 | 8.9 | 1529 | 0.92 | 6.3 | 1.30 | 301 | 11.1 |
| AM1050 | 0.51 | 7.6 | 8.8 | 1525 | 0.92 | 6.3 | 1.12 | 295 | 10.9 |
| AM1051 | 0.50 | 7.0 | 8.7 | 1518 | 0.92 | 6.3 | 0.96 | 289 | 10.7 |
| AM1052 | 0.49 | 6.4 | 8.6 | 1509 | 0.92 | 6.3 | 0.82 | 284 | 10.6 |
| AM1053 | 0.48 | 5.8 | 8.5 | 1498 | 0.92 | 6.3 | 0.69 | 280 | 10.4 |

Tables 13 and 14 describe a series of alloys in which Mo and W are substituted for Cr in such a way as to maintain a constant stability merit index. Apart from their greater corrosion resistance, the high-Cr alloys are of low density and are favourable in terms of hot cracking index and freezing range; this may make them more amenable to the AM process. They would be desirable in applications where high corrosion resistance is needed. Conversely, the low-Cr alloys have greater strength and creep merit indices, making them more useful in highly loaded applications.

TABLE 15

Nominal compositions in wt % of the newly designed high volume fraction of γ' nickel-based superalloys.

| Alloy (wt %) | Al | Co | Cr | Mo | Nb | Ta | Ti | W | C | B | Ru | Re | f (CMI) | f (HCI) |
|---|---|---|---|---|---|---|---|---|---|---|---|---|---|---|
| AM1055 | 4.7 | 19.0 | 9.0 | 1.2 | 2.9 | 4.6 | 0.1 | 6.4 | 0.04 | 0.005 | 1.0 | — | 7.13 | 1.56 |
| AM1056 | 4.7 | 19.0 | 9.0 | 1.2 | 2.9 | 4.6 | 0.1 | 5.7 | 0.04 | 0.005 | 2.0 | — | 6.49 | 1.56 |
| AM1057 | 4.7 | 19.0 | 9.0 | 1.2 | 2.9 | 4.6 | 0.1 | 5.9 | 0.04 | 0.005 | — | 1.0 | 6.69 | 1.56 |
| AM1058 | 4.7 | 19.0 | 9.0 | 1.2 | 2.9 | 4.6 | 0.1 | 4.8 | 0.04 | 0.005 | — | 2.0 | 5.61 | 1.56 |
| AM1059 | 4.7 | 19.0 | 9.0 | 1.2 | 2.9 | 4.6 | 0.1 | 3.7 | 0.04 | 0.005 | — | 3.0 | 4.52 | 1.56 |

TABLE 16

Calculated phase fractions and merit indices made with the "Alloys-by-Design" software of the alloys listed in table 15.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1055 | 0.50 | 8.3 | 8.7 | 1517 | 0.92 | 6.3 | 1.41 | 368 | 74.3 |
| AM1056 | 0.50 | 9.3 | 8.7 | 1512 | 0.91 | 6.3 | 1.50 | 406 | 138 |
| AM1057 | 0.51 | 8.5 | 8.7 | 1520 | 0.92 | 6.3 | 1.01 | 290 | 25.2 |
| AM1058 | 0.50 | 9.8 | 8.7 | 1518 | 0.92 | 6.3 | 0.99 | 289 | 39.5 |
| AM1059 | 0.50 | 11.1 | 8.7 | 1516 | 0.91 | 6.3 | 0.96 | 288 | 53.8 |

Tables 15 and 16 describe alloys with additions of Ru and Re, substituted for W. These alloys all display particularly high creep merit indices, but with significant cost increases over the previously described alloys. This would make them suitable for applications in which strong creep resistance is required in non-cost-limited applications. Care should be taken before applying Ru-bearing alloys as they have high hot cracking indices, due to the impact of Ru on extending the freezing range.

TABLE 17

Nominal compositions in wt % of the newly designed high volume fraction of γ' nickel-based superalloys.

| Alloy (wt %) | Al | Co | Cr | Mo | Nb | Ta | Ti | W | C | B | Zr | f (HCI) | f (CMI) |
|---|---|---|---|---|---|---|---|---|---|---|---|---|---|
| AM1060 | 4.7 | 19.0 | 9.0 | 1.2 | 2.9 | 3.6 | 0.4 | 7.0 | 0.04 | 0.005 | — | 1.41 | 7.8 |
| AM1061 | 4.7 | 19.0 | 9.0 | 1.2 | 2.9 | 2.6 | 0.7 | 7.0 | 0.04 | 0.005 | — | 1.26 | 7.8 |
| AM1062 | 4.7 | 19.0 | 9.0 | 1.2 | 2.9 | 1.6 | 1.0 | 7.0 | 0.04 | 0.005 | — | 1.11 | 7.8 |
| AM1063 | 4.7 | 19.0 | 9.0 | 1.2 | 2.4 | 4.6 | 0.4 | 7.0 | 0.04 | 0.005 | — | 1.41 | 7.8 |
| AM1064 | 4.7 | 19.0 | 9.0 | 1.2 | 1.9 | 4.6 | 0.7 | 7.0 | 0.04 | 0.005 | — | 1.26 | 7.8 |
| AM1065 | 4.7 | 19.0 | 9.0 | 1.2 | 1.4 | 4.6 | 1.0 | 7.0 | 0.04 | 0.005 | — | 1.11 | 7.8 |

TABLE 18

Calculated phase fractions and merit indices made with the "Alloys-by-Design" software of the alloys listed in table 17.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (° C.) | Cost $/kg |
|---|---|---|---|---|---|---|---|---|---|
| AM1060 | 0.51 | 7.4 | 8.7 | 1489 | 0.92 | 6.3 | 1.16 | 288 | 9.84 |
| AM1061 | 0.51 | 7.4 | 8.6 | 1457 | 0.92 | 6.3 | 1.30 | 283 | 8.86 |
| AM1061 | 0.50 | 7.4 | 8.5 | 1425 | 0.92 | 6.3 | 1.45 | 276 | 7.88 |
| AM1063 | 0.51 | 7.4 | 8.7 | 1513 | 0.92 | 6.3 | 1.12 | 295 | 10.6 |
| AM1064 | 0.51 | 7.4 | 8.7 | 1505 | 0.92 | 6.3 | 1.22 | 298 | 10.5 |
| AM1065 | 0.52 | 7.4 | 8.7 | 1495 | 0.92 | 6.3 | 1.34 | 302 | 10.3 |

Tables 17 and 18 describe a series of derivative alloys of AM1006 in which Nb and Ta have been substituted out for Ti up to the allowable limit. In AM1060-62, which have reduced Ta content, clear reductions in density and cost are observed. However, there are corresponding decreases in strength and printability. The same trends are observed in alloys AM1063-65, which have reduced Nb, but the differences are more marginal.

TABLE 19

Nominal compositions in wt % of the newly designed high volume fraction of γ' nickel-based superalloys.

| Alloy (wt %) | Al | Co | Cr | Mo | Nb | Ta | Ti | W | C | B | Zr | Hf | f (HCI) | f (CMI) |
|---|---|---|---|---|---|---|---|---|---|---|---|---|---|---|
| AM1066 | 4.7 | 19.0 | 9.0 | 1.2 | 2.9 | 4.6 | 0.1 | 7.0 | 0.04 | 0.005 | 0.015 | 0.2 | 7.8 | 1.56 |
| AM1067 | 4.7 | 19.0 | 9.0 | 1.2 | 2.9 | 4.6 | 0.1 | 7.0 | 0.04 | 0.005 | 0.015 | 0.4 | 7.8 | 1.56 |
| AM1068 | 4.7 | 19.0 | 9.0 | 1.2 | 2.9 | 4.6 | 0.1 | 7.0 | 0.04 | 0.005 | 0.03 | 0.2 | 7.8 | 1.56 |
| AM1069 | 4.7 | 19.0 | 9.0 | 1.2 | 2.9 | 4.6 | 0.1 | 7.0 | 0.04 | 0.005 | 0.03 | 0.4 | 7.8 | 1.56 |

TABLE 20

Calculated phase fractions and merit indices made with the "Alloys-by-Design" software of the alloys listed in table 19.

| Alloy | γ' | Creep Merit Index ($m^{-2}s \times 10^{-15}$) | Density ($g/cm^3$) | Strength Merit Index (MPa) | Md (eV) | Strain Age Index | Hot Cracking Index | Scheil Freezing Range (°C.) | Cost $/kg |
|---|---|---|---|---|---|---|---|---|---|
| AM1066 | 0.50 | 7.4 | 8.8 | 1491 | 0.92 | 6.3 | 1.11 | 295 | 33.0 |
| AM1067 | 0.50 | 7.4 | 8.8 | 1502 | 0.92 | 6.3 | 1.24 | 325 | 34.3 |
| AM1068 | 0.51 | 7.4 | 8.8 | 1493 | 0.92 | 6.3 | 1.38 | 332 | 33.0 |
| AM1069 | 0.50 | 7.4 | 8.8 | 1503 | 0.92 | 6.3 | 1.49 | 361 | 34.3 |

Tables 19 and 20 describe a series of derivative alloys of AM1006 with various contents of Hf and Zr, designed for improved grain boundary strength. The presence of Hf will also provide these alloys with superior oxidation resistance (AM1067 and AM1069 in particular due to their higher content), due to the beneficial impact of Hf on alumina scale stability.

However, both of these elements act to draw out the terminal freezing range, and therefore increase the hot cracking index, which justifies conservative levels. Although the other examples do not include additions of hafnium or zirconium, the same trends can be expected when hafnium and zirconium are added, along with increased grain boundary strength and in the case of hafnium, superior oxidation resistance. Hafnium may be added in the absence of zirconium and vice versa.

Figure 14:
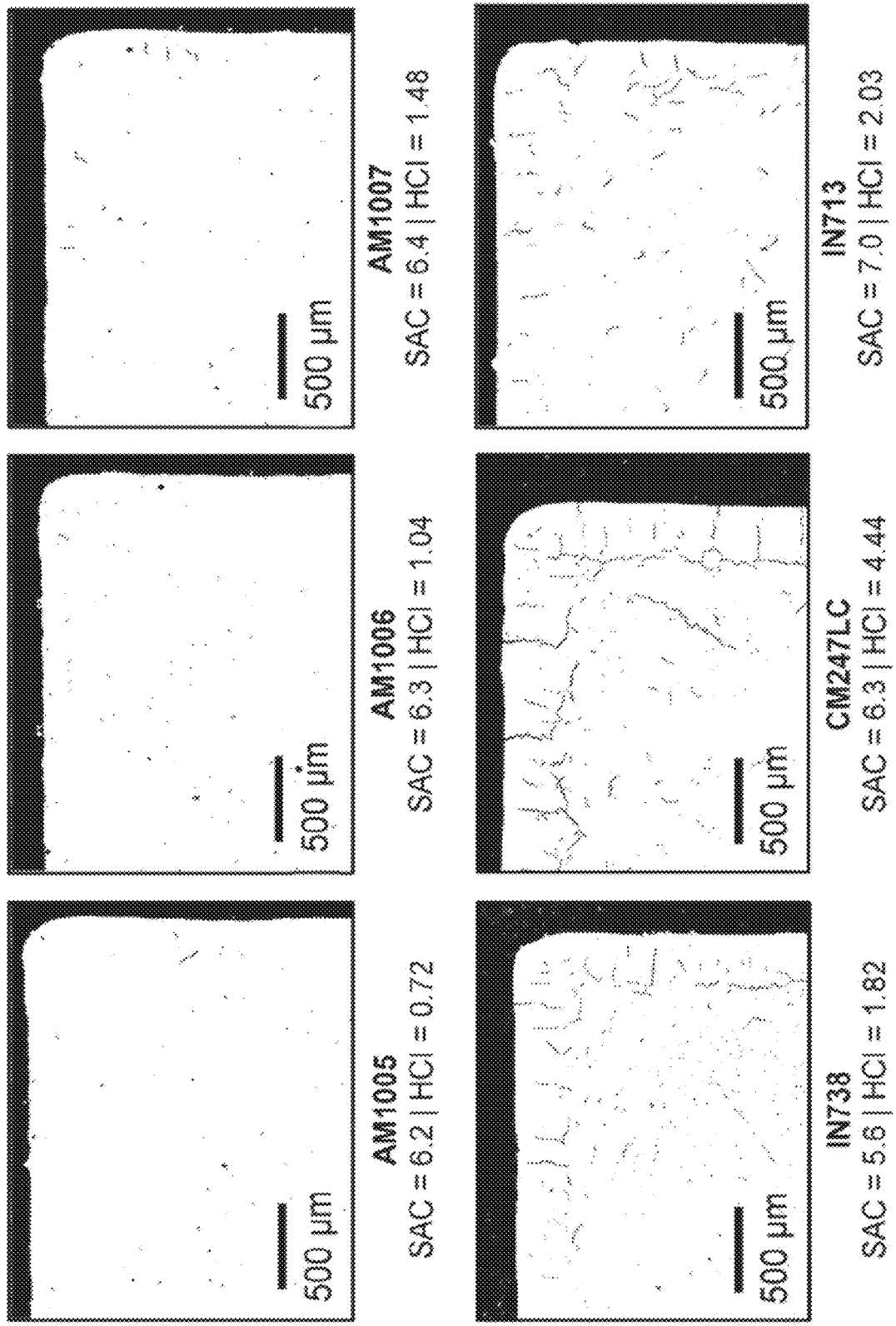
FIG. 14 shows micrographs of nickel-based superalloys manufactured using a powder-bed based AM process. Apparent is the effect of hot cracking index (HCl) on the susceptibility to cracking during AM processing rationalising the preferred limit for hot cracking index of 1.5 or less of the present invention.

In comparison to the baseline alloy AM1005 it is seen that increasing the hot cracking index HCI towards the limit of 1.5 (AM1006 and AM1007) will increase the susceptibility to cracking during AM processing. From FIG. 14 it can be seen that an HCI of 1.5 or less results in little or no cracking during AM manufacture but that with an HCI of 1.5 or more (prior art alloys IN738, CM247C and IN713) substantial cracking occurs during AM manufacture. The samples in FIG. 14 were cubic samples measuring 10 mm×10 mm×10 mm which were fabricated using a selective laser melting powder-bed method to assess the ease of processing by additive manufacture of selected nickel-based superalloys. Samples were manufactured under the same conditions from argon gas atomised alloy powder (15-53 μm) processed under argon atmosphere (<0.1% $O_2$). A fixed energy density of 2.2 J/mm² and a layer thickness of 30 μm was selected to best represent how a machine would operate in a manufacturing situation. Metallographic samples were prepared by sectioning perpendicular to the build direction revealing the X-Y plane after a final 1 μm diamond polish. FIG. 14 shows typical micrographs from an optical microscope after applying histogram-derived thresholding.

The invention claimed is:

1. A nickel-based alloy composition consisting, in weight percent, of: 4.0 to 5.6% aluminium, 0.5 to 1.0% titanium, 0.0 to 4.0% niobium, 0.0 to 11.9% tantalum, 2.0 to 12.7% tungsten, 0.0 to 3.0% molybdenum, 0.0 to 22.0% cobalt, 6.0 to 16.7% chromium, 0.02 to 0.35% carbon, 0.001 to 0.2% boron, 0.00 to less than 0.05% zirconium, 0.0 to 3.0% rhenium, 0.0 to 0.5% vanadium, 0.0 to 0.5% silicon, 0.0 to 0.003% sulphur, 0.0 to 0.25% manganese, 0.0 to 0.1 magnesium, 0.0 to 4.0% iron, 0.0 to 0.5% copper, 0.0 to 1.0% hafnium, the balance being nickel and incidental impurities, wherein the following equations are satisfied in which $W_{Nb}$, and $W_{Ta}$ are the weight percent of niobium and tantalum respectively $$1.1 \leq 0.3W_{Nb} + 0.15W_{Ta}$$

2. The nickel-based alloy composition according to claim 1, wherein the following equation is satisfied in which $W_{Nb}$ and $W_{Ta}$ are the weight percent of niobium and tantalum in the alloy respectively $$1.15 \leq 0.3W_{Nb} + 0.15W_{Ta}.$$

3. The nickel-based alloy composition according to claim 1, wherein the following equation is satisfied in which $W_W$ and $W_{Mo}$ are the weight percent of tungsten and molybdenum in the alloy respectively $$W_W + 0.65W_{Mo} \geq 4.0.$$

4. The nickel-based alloy composition of claim 1, consisting of, in weight percent, more than 8.0% chromium.

5. The nickel-based alloy composition of claim 1, consisting of, in weight percent, 14.7% or less chromium.

6. The nickel-based alloy composition of claim 1 consisting of, in weight percent, 9.8 wt % or less tantalum.

7. The nickel-based alloy composition of claim 1 consisting of, in weight percent, 2.0% or less molybdenum.

8. The nickel-based alloy composition of claim 1 consisting of, in weight percent, 10.7 or less tungsten.

9. The nickel-based alloy composition of claim 1, consisting, in weight percent, 4.5% or more aluminium.

10. The nickel-based alloy composition of claim 1, consisting, in weight percent, 5.3% or less aluminium.

11. The nickel-based alloy composition of claim 1 consisting of, in weight percent, 0.3% or less vanadium.

12. The nickel-based alloy composition according to claim 1, consisting of, in weight percent 1.1 wt % or more tantalum.

13. The nickel-based alloy composition according to claim 1, consisting of, in weight percent, 2.7 wt % or more tungsten.

14. The nickel-based alloy composition of claim 1, wherein the following equation is satisfied in which $W_{Ta}$ and $W_W$ are the weight percent of tantalum and tungsten in the alloy respectively $$W_W + W_{Ta} \leq 13.9$$

15. The nickel-based alloy composition according to claim 1, consisting of, in weight percent 8.0 wt % or more cobalt.

16. The nickel-based alloy composition according to claim 1, consisting of, in weight percent 0.05 wt % or more niobium.

17. The nickel-based alloy composition according to claim 1, consisting of, in weight percent 0.7 to 1.0 wt % titanium.

18. The nickel-based alloy composition according to claim 1, consisting of, in weight percent 0.5 wt % or more molybdenum.

19. The nickel-based alloy composition according to claim 1, consisting of, in weight percent, 0.035 wt % or less zirconium.

20. The nickel-based alloy composition according to claim 1, consisting of, in weight percent, greater than 0.5 to 1.0% titanium.

21. The nickel-based alloy composition according to claim 1, consisting of, in weight percent, 0.1% or more of hafnium.

22. The nickel-based alloy composition according to claim 1, further comprising rhenium.

23. The nickel-based alloy composition according to claim 1, consisting of, in weight percent, 0.1 to 4.0% iron.

24. The nickel-based alloy composition according to claim 1, wherein the composition does not include hafnium.

25. The nickel-based alloy composition according to claim 1, consisting of, in weight percent, 0.0 to 7.1% tantalum.

* * * * *